(12) United States Patent
Kida et al.

(10) Patent No.: US 12,187,194 B2
(45) Date of Patent: Jan. 7, 2025

(54) PERIPHERY-IMAGE DISPLAY DEVICE AND DISPLAY CONTROL METHOD

(71) Applicants: DENSO CORPORATION, Kariya (JP); TOYOTA JIDOSHA KABUSHIKI KAISHA, Toyota (JP)

(72) Inventors: Shogo Kida, Kariya (JP); Shinichi Moriyama, Kariya (JP); Tomoki Miyata, Toyota (JP); Jun Kamishima, Toyota (JP); Yamato Yorifuji, Aichi-ken (JP); Kohei Maejima, Nagakute (JP)

(73) Assignees: DENSO CORPORATION, Kariya (JP); TOYOTA JIDOSHA KABUSHIKI KAISHA, Toyota (JP)

(*) Notice: Subject to any disclaimer, the term of this patent is extended or adjusted under 35 U.S.C. 154(b) by 405 days.

(21) Appl. No.: 17/644,289

(22) Filed: Dec. 14, 2021

(65) Prior Publication Data
US 2022/0185183 A1 Jun. 16, 2022

(30) Foreign Application Priority Data
Dec. 16, 2020 (JP) .................................. 2020-208545

(51) Int. Cl.
*B60R 1/00* (2022.01)

(52) U.S. Cl.
CPC ........ *B60R 1/002* (2013.01); *B60R 2300/105* (2013.01); *B60R 2300/303* (2013.01); *B60R 2300/305* (2013.01); *B60R 2300/607* (2013.01)

(58) Field of Classification Search
CPC .............. B60R 1/002; B60R 2300/105; B60R 2300/303; B60R 2300/305; B60R 2300/607; B60R 2300/605; B60R 1/27; H04N 7/181; H04N 5/2624; H04N 13/161; H04N 23/667; H04N 23/951
See application file for complete search history.

(56) References Cited

U.S. PATENT DOCUMENTS

| | | | |
|---|---|---|---|
| 2012/0113261 A1 | 5/2012 | Satoh | |
| 2016/0182823 A1 | 6/2016 | Murasumi et al. | |
| 2018/0272948 A1 | 9/2018 | Kumon et al. | |
| 2019/0244324 A1 | 8/2019 | Watanabe et al. | |
| 2019/0325650 A1* | 10/2019 | Milz | H04N 23/54 |
| 2020/0336658 A1 | 10/2020 | Crespo De La Vina | |

FOREIGN PATENT DOCUMENTS

JP 2012-039341 A 2/2012

* cited by examiner

*Primary Examiner* — Said Broome
*Assistant Examiner* — Andrew Shin
(74) *Attorney, Agent, or Firm* — MASCHOFF BRENNAN

(57) ABSTRACT

A synthetic-image formation unit forms a vehicle-inside view point image showing a periphery of a vehicle in such a way as to transparently pass through a portion or an entirety of the vehicle and taken from a vehicle-inside view point inside a vehicle room. The synthetic-image formation unit further forms an interior-added image including an image of an interior member viewed from the vehicle-inside view point using pre-stored data for drawing an image of the interior member. A display control unit temporarily displays the interior-added image and displays animation which gradually raises a transparency of the image of the interior member, before displaying the vehicle-inside view point image, when changing over a display screen of the display to the vehicle-inside view point image in response to a user's manipulation on the vehicle.

7 Claims, 12 Drawing Sheets ex. 3m

PERIPHERY-IMAGE DISPLAY DEVICE AND DISPLAY CONTROL METHOD

CROSS REFERENCE TO RELATED APPLICATION

The present application claims the benefit of priority from Japanese Patent Application No. 2020-208545 filed on Dec. 16, 2020. The entire disclosures of all of the above applications are incorporated herein by reference.

TECHNICAL FIELD

The present disclosure relates to a periphery-image display device and a display control method for forming and displaying a periphery image.

BACKGROUND

Conventionally, a known device is configured to display, as periphery images showing the periphery of a vehicle, images captured by cameras placed at a plurality of positions on a vehicle or synthetic images provided by synthesizing the captured images.

SUMMARY

According to a first aspect of the present disclosure, a periphery-image display device for a vehicle comprises a synthetic-image formation unit configured to form a periphery image which is a synthetic image showing a region of a periphery of the vehicle viewed from an arbitrary virtual view point by using a plurality of camera images captured by a plurality of cameras configured to photograph the periphery of the vehicle. The periphery-image display device further comprises a display control unit configured to execute processing for displaying, on a display, the periphery image formed by the synthetic-image formation unit.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
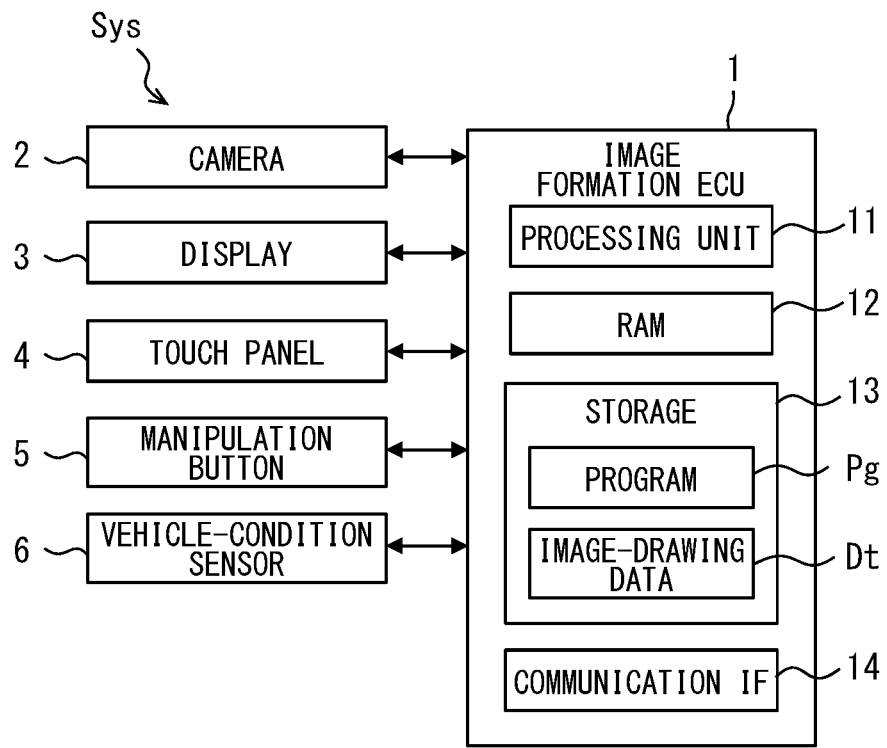
FIG. 1 is a block diagram illustrating the overview of a periphery display system Sys.

Hereinafter, examples of the present disclosure will be described.

According to an example of the present disclosure, a periphery-image display device is configured to display, as periphery images showing the periphery of a vehicle, images captured by cameras placed at a plurality of positions on a vehicle or synthetic images provided by synthesizing these captured images. The synthetic images as periphery images may include overlooking images showing the periphery of the vehicle in such a way as to look down on the vehicle from the above, driver's view point images showing the periphery of the vehicle which is viewed from a driver's view point, in such a way as to transparently pass through an instrument panel, and the like.

By employing a structure configured to display periphery images taken from various view points, it is possible to allow a user to view pictures at a desired view point, thereby improving the usability. On the other hand, since periphery images taken from the increased view points can be displayed, an issue is induced as follows. That is, when the content displayed on the display has been changed over to a periphery image, the user may find it hard to intuitively understand from which view point the periphery image being displayed is taken.

According to an example of the present disclosure, a periphery-image display device for a vehicle comprises a synthetic-image formation unit configured to form a periphery image which is a synthetic image showing a region of a periphery of the vehicle viewed from an arbitrary virtual view point, using a plurality of camera images captured by a plurality of cameras configured to photograph the periphery of the vehicle. The periphery-image display device further comprises a display control unit configured to execute processing for displaying, on a display, the periphery image formed by the synthetic-image formation unit. The synthetic-image formation unit is configured to form a vehicle-inside view point image showing the periphery of the vehicle in such a way as to transparently pass through a portion or an entirety of the vehicle, the vehicle-inside view point image being the periphery image taken from a vehicle-inside view point as the virtual view point positioned inside a vehicle room. The synthetic-image formation unit is further configured to form an interior-added image which is a synthetic image including an image of an interior member viewed from the vehicle-inside view point, using data for drawing an image of the interior member, the data being stored in a predetermined storage medium. The display control unit is configured to temporarily display the interior-added image and to display animation which gradually raises a transparency of the image of the interior member, before displaying the vehicle-inside view point image, when changing over a display screen of the display to the vehicle-inside view point image in response to a user's manipulation on the vehicle.

With the aforementioned structure, when the screen is changed over to a vehicle-inside view point image, an image including an image of an interior member is temporarily displayed, rather than suddenly displaying a periphery image which transparently shows the interior member such as an instrument panel. Then, the image of the interior member is gradually made transparent, so that a vehicle-inside view point image is displayed finally. By temporarily displaying the interior member as described above, it is possible to allow the user to easily recognize in which direction the periphery image being displayed is taken.

According to an example of the present disclosure, a display control method is implemented by at least one processor to control display of a periphery image, which is a synthetic image showing a region of a periphery of a vehicle and viewed from an arbitrary virtual view point by using a plurality of camera images captured by a plurality of cameras configured to photograph the periphery of the vehicle. The display control method comprises forming a vehicle-inside view point image showing, as the periphery image, the periphery of the vehicle in such a way as to transparently pass through a portion or an entirety of the vehicle, the vehicle-inside view point image being the periphery image taken from a vehicle-inside view point as the virtual view point positioned inside a vehicle room. The display control method further comprises forming an interior-added image which is the synthetic image including an image of an interior member viewed from the vehicle-inside view point by using data, which is for drawing an image of the interior member and stored in a predetermined storage medium. The display control method further comprises displaying the synthetic image, which is formed, on a display. The display control method further comprises temporarily displaying the interior-added image and thereafter displaying animation which gradually raises a transparency of the image of the interior member in the interior-added image, before displaying the vehicle-inside view point image, when a display screen of the display is changed over to the vehicle-inside view point image in response to a user's manipulation on the vehicle.

The aforementioned display control method is a method corresponding to the aforementioned periphery-image display device and provides the same advantages through the same effects as those of the aforementioned periphery-image display device.

Hereinafter, with reference to the drawings, there will be described embodiments of a periphery display system Sys according to the present disclosure. The periphery display system Sys displays, on a display, images of the periphery of a vehicle incorporating this system. Hereinafter, the vehicle Hv incorporating the periphery display system Sys will be also referred to as one's subject vehicle.

<Introductions>

One's subject vehicle according to the present embodiment is a four-wheel-drive car which is estimated to travel not only on roads having road surfaces paved with asphalt and the like (namely, on-roads), however also on off-roads. One's subject vehicle has a normal mode and an off-road mode as travelling modes. The normal mode is a travelling mode suitable for travelling on on-roads. The off-road mode is a travelling mode suitable for travelling on off-roads. In the respective travelling modes, the distribution of driving force to the front, rear, left and right wheels is controlled in different ways. In this case, the term "off-road" mainly designates a ground surface having larger concavity and convexity, such as a rocky road. As a matter of course, "off-roads" can be understood to designate ground surfaces other than on-roads, namely unpaved ground surfaces in general. The present disclosure may be also applied to vehicles which are not estimated to travel on off-roads. One's subject vehicle may be either a vehicle having an engine as a driving power source or an electric car or a hybrid car which includes a motor as a driving power source.

In the following description, the forward, rearward, leftward, rightward, upward and downward directions are each defined with respect to one's subject vehicle. More specifically, the forward and rearward directions correspond to the longitudinal directions of one's subject vehicle. The leftward and rightward directions correspond to the widthwise directions of one's subject vehicle. The upward and downward directions correspond to the heightwise directions of the vehicle. From another standpoint, the upward and downward directions correspond to directions perpendicular to a plane parallel to the forward and rearward directions and the leftward and rightward directions. In the present disclosure, a plane perpendicular to the vehicle heightwise direction is also referred to as a vehicle horizontal plane. Directions perpendicular to the vehicle heightwise direction, which include the forward, rearward, leftward and rightward directions, are also referred to as vehicle horizontal directions. The vehicle horizontal directions correspond to directions which get farther away from one's subject vehicle.

In addition, in the present disclosure, "parallel" is not limited to a completely-parallel state. "Parallel" may represent a state of being inclined by several degrees to about 20 degrees. Namely, "parallel" may include generally-parallel states (so-called substantially-parallel states). In the present disclosure, the expression "perpendicular" is not limited to a completely-perpendicular state and may include states of being inclined by several degrees to about 20 degrees.

<Description of the Entire Structure>

FIG. 1 is a view illustrating an example of a schematic structure of a periphery display system Sys according to the present disclosure. As illustrated in FIG. 1, the periphery display system Sys includes an image formation ECU 1, a plurality of cameras 2, a display 3, a touch panel 4, a manipulation button 5, and vehicle-condition sensors 6. Among the denominations of the members, the term "ECU", which is an abbreviation for Electronic Control Unit, means an electronic control device.

The image formation ECU 1 is connected to the plurality of cameras 2, the display 3, the touch panel 4, the manipulation button 5, and the vehicle-condition sensors 6, in such a way as to communicate with respective one of them. The image formation ECU 1 may be connected to the aforementioned various devices or sensors, either individually through dedicated lines or through a vehicle-inside network which is a communication network structured in the vehicle. For example, the image formation ECU 1 may be directly connected to the cameras 2 through dedicated picture signal lines.

The image formation ECU 1 is an ECU, as follows. That is, the ECU forms a synthetic image of a vehicle peripheral region viewed from an arbitrary view point, based on image data inputted from the respective cameras 2, as an image for assisting manipulations for driving a vehicle Hv. Further, the ECU displays the synthetic image on the display 3. The image formation ECU 1 corresponds to a periphery-image display device. The image formation ECU 1 is realized using a computer. Namely, the image formation ECU 1 includes a processing unit 11, a RAM 12, a storage 13, an I/O 14, and bus lines for connecting these structures to each other.

The processing unit 11 is hardware for arithmetic processing (in other words, an arithmetic core), which is connected to the RAM 12. The processing unit 11 is a CPU, for example. The processing unit 11 executes various processing for realizing the functions of respective functional portions, which will be described later, by accessing the RAM 12. The RAM 12 is a volatile storage medium.

The storage 13 is structured to include a non-volatile storage medium, such as a flash memory. The storage 13 stores an image formation program Pg as firmware, and various image-drawing data Dt for enabling a synthetic-image formation unit F5 to form synthetic images. The image-drawing data Dt includes data indicating the shape of a projection surface TS which will be described later, 3D-model data indicating the external appearance of one's subject vehicle, 3D-model data about predetermined constituent members of one's subject vehicle, and the like. As the constituent members for which the 3D-model data has been prepared, there are various interior members, such as a handle, an instrument panel, pillars, body panels, seats, and a center console. Further, the storage 13 also stores 3D-model data about tires, as the image-drawing data Dt. Further, execution of the image formation program Pg by the processing unit 11 corresponds to execution of a display control method which is a method corresponding to this image formation program Pg. The I/O 14 is a circuit module for communication with other devices. The I/O 14 is realized using analog circuit elements, ICs and the like. The image formation ECU 1 will be described later separately, in more detail.

Figure 2:
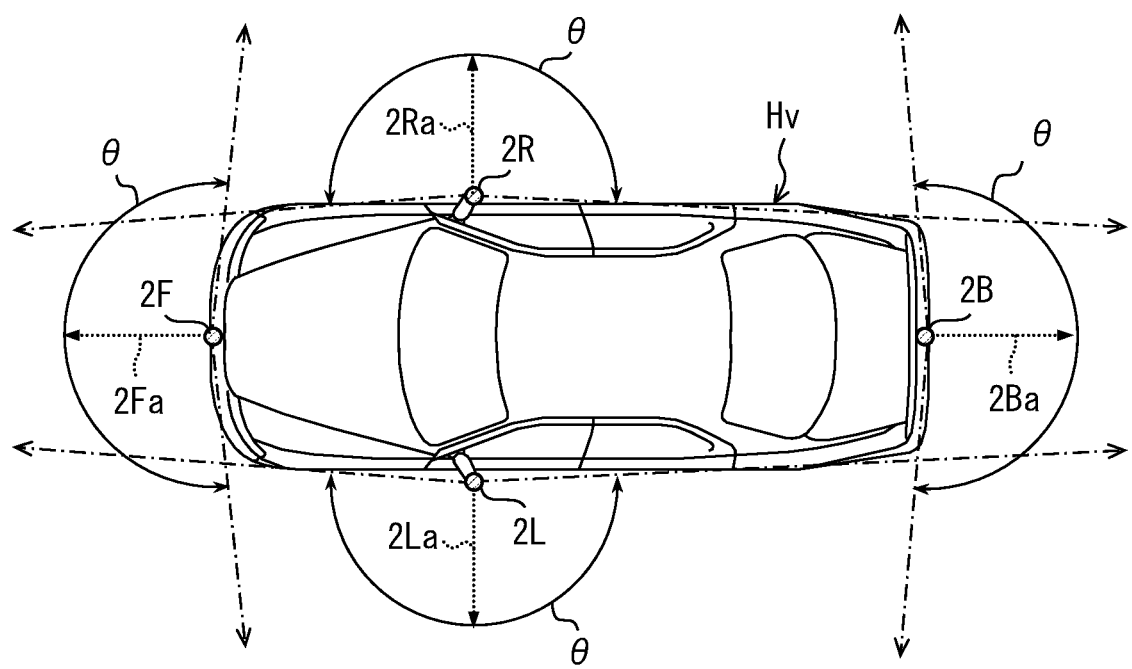
FIG. 2 is a view illustrating the positions at which respective cameras are mounted, and the ranges of photographing thereby.

The cameras 2 are in-vehicle cameras configured to photograph the periphery of one's subject vehicle and to output data of images resulted from the photographing to the image formation ECU 1. Each of the cameras 2 includes at least a lens and an image-pickup element and electronically acquires an image showing a periphery of one's subject vehicle. The plurality of cameras 2 are mounted at predetermined positions on one's subject vehicle at predetermined attitudes, in such a way as to photograph respective different ranges. The periphery display system Sys according to the present embodiment includes a front camera 2F, a rear camera 2B, a left-side camera 2L, and a right-side camera 2R, as the cameras 2, as illustrated in FIG. 2. These four cameras 2 are placed at respective different positions in one's subject vehicle and are configured to photograph the periphery of one's subject vehicle in respective different directions. More specifically, this is attained as follows.

The front camera 2F is a camera for photographing the forward of the vehicle at a predetermined angle of view. The front camera 2F is mounted at such an attitude that its optical axis 2Fa is oriented in the frontward direction of one's subject vehicle, at a front edge of one's subject vehicle, such as a front grill, for example. The rear camera 2B is a camera for photographing the rearward of the vehicle at a predetermined angle of view. The rear camera 2B is mounted at such an attitude that its optical axis 2Ba is oriented rearward of one's subject vehicle, at a predetermined position on the vehicle-body rear surface portion, such as near the rear number plater or near the rear window, for example. The left-side camera 2L is a camera for photographing the left of one's subject vehicle. The left-side camera 2L is mounted on a left-side mirror, at such an attitude that its optical axis 2La is oriented leftward of one's subject vehicle. The right-side camera 2R is a camera for photographing the right of one's subject vehicle. The right-side camera 2R is mounted on a right-side mirror at such an attitude that its optical axis 2Ra is oriented rightward of one's subject vehicle. Each camera 2 may be also mounted at such an attitude that its optical axis is oriented downwardly by a predetermined amount, such as by 10 degrees, with respect to a vehicle horizontal direction.

As the lenses in these cameras 2, wide-angle lenses such as fish-eye lenses are employed, and each of the cameras 2 has an angle of view θ equal to or more than 180 degrees. Therefore, by using the four cameras 2, it is possible to photograph the entire range around one's subject vehicle. Further, it is possible to properly change the aforementioned positions at which the respective cameras 2 are mounted. The front camera 2F may be also mounted to the room mirror or the upper end portion of the front glass. The right-side camera 2R and the left-side camera 2L may be also placed near the root portions of an A pillar and a B pillar. The periphery display system Sys may also include a camera 2 mounted on the roof. Some or all of the cameras 2 may be also cameras which are later-appended on the roof, on the dash board, near the window frames and the like, for example.

The storage 13 stores data indicating the positions and the attitudes at which the respective cameras 2 are mounted in the vehicle Hv (hereinafter, which will be referred to as "mounting position data"). The positions at which the respective cameras 2 are mounted may be expressed as points in 3D coordinates centered at an arbitrary position in the vehicle Hv (hereinafter, referred to as a vehicle 3D coordinate system), for example. An X axis which forms the vehicle 3D coordinate system may be an axis parallel to the leftward-and-rightward direction of the vehicle, for example. Further, a Y axis can be an axis parallel to the forward-and-rearward direction. A Z axis can be an axis parallel to the hightwise direction of the vehicle. The rightward direction of the vehicle corresponds to the X-axis positive direction, the forward direction of the vehicle corresponds to the Y-axis positive direction, and the upward direction of the vehicle corresponds to the Z-axis positive direction. The center of the vehicle 3D coordinate system can be the center of the rear wheel shaft, for example.

The display 3 is a device which includes a thin-type display panel such as a liquid crystal display panel, for example, and displays various types of information and images thereon. The display 3 is placed in the instrument panel or the like in one's subject vehicle, in such a way as to allow a user to view its screen. The display 3 may be also placed within the same housing as that of the image formation ECU 1 and, thus, may be integrated with the image formation ECU 1. As a matter of course, the display 3 may be also a device separated from the image formation ECU 1. The display 3 includes the touch panel 4 laminated on the display panel and, thus, is enabled to receive user's manipulations thereon. The touch panel 4 is constituted by a capacitance-type touch panel, for example, and is configured to output signals indicative of positions touched by the user. Here, the term "user" mainly designates an occupant in the driver's seat (so-called a driver). The term "user" may also include an occupant in the assistant driver's seat, besides the driver.

The manipulation button 5 is a manipulation component which receives user's manipulations with respect to contents displayed on the display 3. The manipulation button 5 is a switch for displaying a camera image or a synthetic image formed by the image formation ECU 1 on the display 3 or for changing a virtual view point of a synthetic image, and the like. The manipulation button 5 is provided on the steering wheel in one's subject vehicle, for example, and receives driver's manipulations mainly. The user can perform various manipulations on the periphery display system Sys, through the manipulation button 5 and the touch panel 4. If the user performs a manipulation on the manipulation button 5 or the touch panel 4, a manipulation signal indicating the content of this manipulation is inputted to the image formation ECU 1. The manipulation button 5 may be also referred to as a multi-information switch. The manipulation button 5 may be also placed on the instrument panel.

Further, the periphery display system Sys may also include a travelling-mode switch, as a manipulation component for enabling the driver to change over the travelling mode of the vehicle Hv to an off-road mode. The manipulation component for changing over the travelling mode may be of a dial type. The shift lever may be provided with the function of the travelling-mode switch.

The vehicle-condition sensors 6 are sensors for detecting the quantities of conditions relating to the travelling control for one's subject vehicle. The vehicle-condition sensors 6 include a shift sensor, a vehicle-speed sensor, a steering-angle sensor, an acceleration sensor, and the like. The shift sensor is a sensor for detecting a shift position. The vehicle-speed sensor is a sensor for detecting the travelling speed of one's subject vehicle. The steering-angle sensor is a sensor for detecting the rotational angle of the handle (so-called a steering angle). The acceleration sensor is a sensor for detecting the acceleration acting on one's subject vehicle in at least one direction, out of the forward-and-rearward direction of the vehicle, the lateral direction and the upward-and-downward direction. In this case, it is assumed that a three-axis acceleration sensor is employed as the acceleration sensor. Values detected by the acceleration sensor can be utilized as materials for determining the vehicle attitude with respect to a horizontal plane. The types of the sensors employed in the periphery display system Sys as the vehicle-condition sensors 6 can be properly designed, and the periphery display system Sys is not required to include all the aforementioned sensors. The vehicle-condition sensors 6 may also include a vehicle-height sensor, a gyro sensor, an azimuthal angle sensor, and the like. The respective sensors output data indicating the current values of the quantities of physical conditions to be detected (namely, the results of detections), to the image formation ECU 1.

<Regarding the Structure of the Image Formation ECU>

Figure 3:
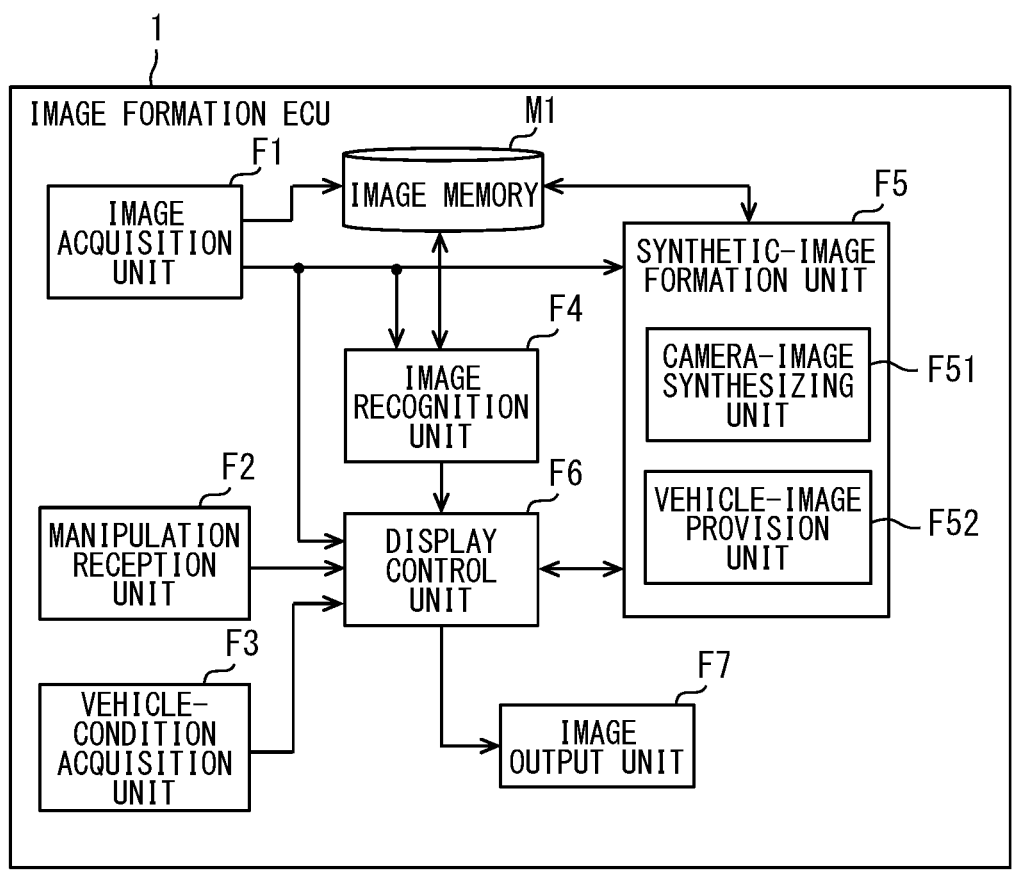
FIG. 3 is a block diagram for explaining the functions of an image formation ECU

The image formation ECU 1 includes an image acquisition unit F1, a manipulation reception unit F2, a vehicle-condition acquisition unit F3, an image recognition unit F4, a synthetic-image formation unit F5, a display control unit F6, and an image output unit F7, as functional portions, as illustrated in FIG. 3. The image formation ECU 1 includes an image memory M1 as a memory for temporarily holding image data. The image memory M1 is realized by using a portion of the memory area included in the RAM 12, for example. Image data provided from the respective cameras 2 is stored in the image memory M1, in association with positional information and orientation information about the vehicle Hv during photographing.

The image acquisition unit F1 acquires camera images which are images formed by the respective four cameras 2. Images from each camera 2 are combined with each other, thereby providing image data about the entire range around one's subject vehicle. The image acquisition unit F1 convers image signals inputted from the cameras 2 into digital image data of a predetermined data format and, then, outputs it to the image recognition unit F4 and the synthetic-image formation unit F5.

Every time one's subject vehicle has moved for a predetermined distance for storage, for example, the image acquisition unit F1 stores data of images captured at this time point by the respective cameras 2, in the image memory M1, in association with the positional information and the vehicle-body attitude information about one's subject vehicle, which are separately acquired. The distance for storage can be, for example, 0.1 m, 0.3 m, 0.5 m or the like. During forward travelling of the vehicle, for example, the image acquisition unit F1 is required only to store, in the image memory M1, image data captured by the front camera 2F which is photographing at least the ground surface from just beneath the vehicle front edge to ahead thereof by 3 m. During rearward travelling of the vehicle, the image acquisition unit F1 is required only to store, in the image memory M1, image data captured by the rear camera 2B which is photographing at least the ground surface from just beneath the vehicle rear edge to ahead thereof by 3 m.

As the aspect of storage of image data in the image memory M1, it is possible to employ various aspects. For example, the image acquisition unit F1 overwrites and stores new data in an oldest-updated area, in the image memory M1. Also, the image acquisition unit F1 may store image frames acquired within a latest predetermined time period, in a different area from that of image data captured for every constant distance described above, regardless of the movement distance. The image data stored in the image memory M1 can be referred by the image recognition unit F4, the synthetic-image formation unit F5, the display control unit F6 and the like. The image acquisition unit F1 may perform image processing corresponding to lens characteristics, such as distortion corrections, enlarging and reducing, cutting out, on images acquired from the cameras 2, before storing them in the image memory M1.

The manipulation reception unit F2 receives manipulation signals outputted from the manipulation button 5 and the touch panel 4. Manipulation signals are signals indicating the contents of manipulations performed by the user, on the manipulation button 5 and the touch panel 4. Thus, the manipulation reception unit F2 receives user's command manipulations with respect to the display of synthetic images and camera images. The manipulation reception unit F2 inputs data corresponding to the received manipulation signals, to the display control unit F6.

The vehicle-condition acquisition unit F3 is structured to acquire information indicating conditions of one's subject vehicle, from other devices provided in one's subject vehicle, such as the vehicle-condition sensors 6. The vehicle-condition acquisition unit F3 acquires the shift position, the accelerations in the directions of respective detection axes, the vehicle speed, the steering angle and the like, from the various sensors. Also, the vehicle-condition acquisition unit F3 may acquire various quantities of conditions from other ECUs. For example, the vehicle-condition acquisition unit F3 may acquire information about the steering angle and the like, from an ECU which constitutes a steering system. Also, the vehicle-condition acquisition unit F3 may acquire, from the image recognition unit F4, the distance for which the vehicle has moved, the amount of change of the orientation of the vehicle, and the like, with respect to those of a predetermined time period before. Namely, the vehicle-condition acquisition unit F3 may acquire various types of information relating to conditions of one's subject vehicle, from other ECUs and the image recognition unit F4, as well as from the sensors. The vehicle-condition acquisition unit F3 may be configured to calculate the vehicle movement distance, the amount of change of the orientation of the vehicle body and the like, by combining a plurality of types of information. "The orientation of the vehicle" may include not only the direction in which the vehicle is oriented (so-called a yaw angle), however also a pitch angle and a roll angle.

The image recognition unit F4 is structured to detect the position of a predetermined to-be-detected object, the type thereof, and the like, by analyzing images inputted from the cameras 2. The image recognition unit F4 has the functions of an identifier for identifying types of objects, based on characteristic-quantity vectors in images, for example. The image recognition unit F4 identifies objects, using CNN (Convolutional Neural Network) techniques and DNN (Deep Neural Network) techniques which utilize deep learning, for example. Such to-be-detected objects include road markings such as compartment lines which can be provided on paved roads, road edges, curbstones, and the like, besides pedestrians and other vehicles. Compartment lines may include lines as lane markers, and lines indicative of parking frames.

The image recognition unit F4 may be also structured to estimate the amount of movement of one's subject vehicle and the amount of change of the orientation thereof, based on the amount of positional change of a characteristic point determined properly on images, between image frames. For example, the image recognition unit F4 is structured to estimate the current position with respect to a certain reference point, the amount of movement, the amount of change of the orientation of the vehicle body, the yaw rate and the like, using an optical flow method which is one type of an inter-frame difference method. An optical flow is information indicating movements of objects seen in image data by vectors. Results of object recognition by the image recognition unit F4 and results of estimation of the position of one's subject vehicle and the like by the image recognition unit F4 are outputted to the vehicle-condition acquisition unit F3, the display control unit F6, and the like.

The synthetic-image formation unit F5 is structured to perform image processing for forming synthetic images, for example. The synthetic-image formation unit F5 projects data of the plurality of camera images on a virtual projection surface TS corresponding to the periphery of one's subject vehicle. Further, the synthetic-image formation unit F5 forms a synthetic image showing the periphery of one's subject vehicle which is viewed from a virtual view point VP, using the data on this projection surface.

Figure 4:
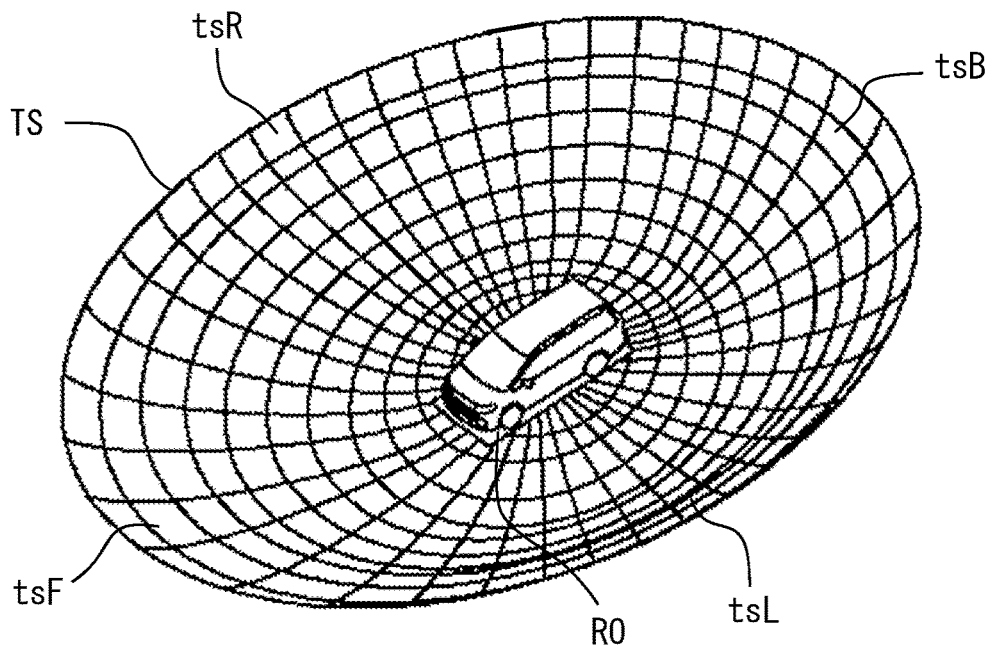
FIG. 4 is a view for explaining a projection surface.

The projection surface TS is a virtual stereoscopic surface corresponding to the peripheral region around one's subject vehicle, as conceptually illustrated in FIG. 4. A center region of the projection surface TS is defined as a vehicle region R0 as the position of one's subject vehicle. The vehicle region R0 is set to be a rectangular flat portion, for example. The vehicle region R0 is set to include a region overlapped with one's subject vehicle in a top view, namely a region which cannot be directly photographed by the cameras 2. The projection surface TS has a bowl shape having a downwardly-convex curved surface, wherein the projection surface TS has a flat surface along a vehicle horizontal direction around the vehicle region R0 and, also, has larger inclinations (gradients) at larger distances from the vehicle region R0. Respective portions of the projection surface TS are associated with corresponding portions of camera images to be projected onto these respective portions of the projection surface TS, according to correspondence information such as table data. Projecting camera images onto the projection surface TS corresponds to performing texture mapping of camera images onto the projection surface TS.

The shape of the projection surface TS may be changed as required. For example, the projection surface TS may be also made to have a horizontal surface over its entire region. Also, the projection surface TS may also have a shape having a downwardly-convex curved-surface region starting from the edge portion of the vehicle region R0, without having a flat-surface region.

The display control unit F6 controls the operation of the synthetic-image formation unit F5. For example, the display control unit F6 controls a virtual view point VP used for forming a synthetic image. The synthetic-image formation unit F5 includes a camera-image synthesizing unit F51 and a vehicle-image provision unit F52, as sub functions. The camera-image synthesizing unit F51 is structured to project respective camera images on the aforementioned projection surface TS. The vehicle-image provision unit F52 is structured to place an image of the vehicle Hv at a predetermined position in the projection surface TS on which the camera images have been projected. The camera-image synthesizing unit F51 and the vehicle-image provision unit F52 will be described later separately, in more detail.

The display control unit F6 comprehensively controls the entirety of the image formation ECU 1 and, also, controls an image displayed on the display 3. The display control unit F6 outputs at least one of a camera image and a synthetic image formed by the synthetic-image formation unit F5, to the display 3, when a predetermined periphery-image display condition is satisfied. A camera image is displayed thereon in a state of having been subjected to distortion corrections and the like for being displayed. The display control unit F6 determines the combination of images displayed on the display 3, according to the direction of travelling of one's subject vehicle and user's manipulations on the touch panel 4 and the like. The display control unit F6 displays, on the display 3, images corresponding to an operation mode specified by the user. Thus, a periphery image including a region of at least a portion of the periphery of the vehicle, as a photographed-object image, is displayed on the display 3.

In the present specification, the term "periphery image" means an image showing a region of at least a portion of the periphery of the vehicle and conceptually includes both a synthetic image and a camera image having been adjusted for being displayed. Such a camera image having been adjusted for being displayed forms a periphery image taken from a view point at the position of the lens of the camera 2 which has acquired this camera image. Such a synthetic image forms a periphery image taken from a virtual view point VP set at an arbitrary position of the periphery of the vehicle.

Figure 5:
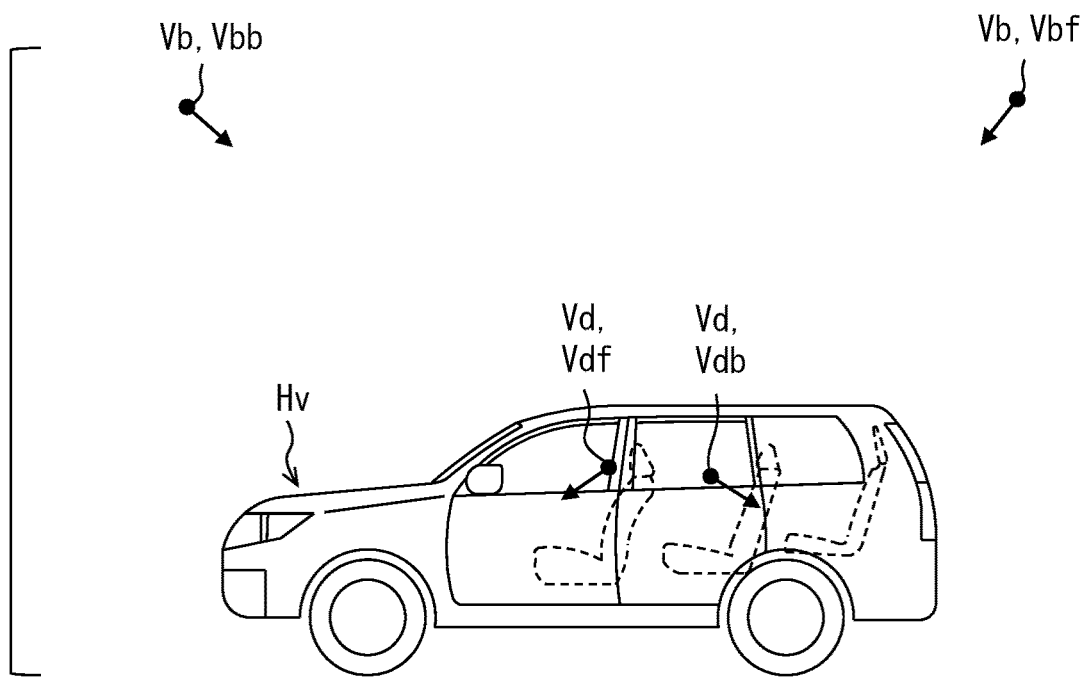
FIG. 5 is a view for explaining a virtual view point.

The display control unit F6 has the function of controlling the synthetic-image formation unit F5 based on information inputted from the manipulation reception unit F2 and the vehicle-condition acquisition unit F3, in order to cause the synthetic-image formation unit F5 to form synthetic images according to the condition of travelling of one's subject vehicle and settings made by the user. For example, the display control unit F6 sets the position and the sight direction of a virtual view point VP for forming a synthetic image, which will be described later, based on at least one of the direction of travelling of one's subject vehicle, a signal from the touch panel 4 and a signal from the manipulation button 5. As settable patterns of the virtual view point VP, as illustrated in FIG. 5, it is possible to employ a rearward bird's-eye view point Vbb, a forward bird's-eye view point Vbf, a forward vehicle-inside view point Vdf, a rearward vehicle-inside view point Vdb, and the like.

The rearward bird's-eye view point Vbb corresponds to a virtual view point VP which looks down on the vehicle Hv and the rearward thereof, at a point positioned above the roof portion of the vehicle Hv and forward of the vehicle. The forward bird's-eye view point Vbf corresponds to a virtual view point VP which looks down on the vehicle Hv and the forward thereof, at a point positioned above the roof portion of the vehicle Hv and rearward of the vehicle. The forward bird's-eye view point Vbf corresponds to a first bird's-eye view point, and the rearward bird's-eye view point Vbb corresponds to a second bird's-eye view point.

The bird's-eye view points Vb are not limited to the aforementioned examples, and it is also possible to employ patterns of bird's-eye view points Vb set just above the vehicle or at positions deviated laterally from just above the vehicle. The bird's-eye view points Vb such as the rearward bird's-eye view point Vbb and the forward bird's-eye view point Vbf correspond to examples of a vehicle-outside view point, which is a virtual view points VP placed outside the vehicle room. It is possible to employ various bird's-eye view points Vb, in cases of forming bird's-eye view images, which are images of one's subject vehicle and the periphery thereof which are overlooked from above the vehicle. The viewing angle of the bird's-eye view points Vb is properly adjusted in such a way as to include a predetermined range of the periphery of the vehicle.

The forward vehicle-inside view point Vdf is a settable pattern of the virtual view point VP, where the position of the view point is set at an estimated position of the driver's eyes inside the vehicle room. The sight direction of the forward vehicle-inside view point Vdf can be set to be a forward and obliquely-downward direction in such a way as to include the vicinity of the front wheels, for example. The "obliquely-downward direction" can be assumed to be a direction downward by about 20 to 30 degrees with respect to a vehicle horizontal plane, for example. This forward vehicle-inside view point Vdf may be also referred to as a driver's view point.

The sight direction of the forward vehicle-inside view point Vdf may be made changeable to an arbitrary direction, within a predetermined leftward-and-rightward angle range, based on user's manipulations (for example, swiping) on the touch panel 4, while the forward-and-obliquely-downward direction is defined as a default direction. The viewing angle of the forward vehicle-inside view point Vdf can be also adjusted as required, in such a way as to include a predetermined range near the front wheels. For example, the viewing angle φ of the forward vehicle-inside view point Vdf can be made to be 100 degrees in the horizontal direction and 60 degrees in the vertical direction.

The estimated position of the driver's eyes is set near the head rest of the driver's seat, for example. The estimated position of the driver's eyes can be also set at the center of an eyellipse, which is defined for every type of vehicle. Such an eyellipse is a virtual spatial region defined for every type of vehicle. The eyellipse is set to have a virtual elliptical shape, based on an eye range which statically expresses a special distribution of eye points of occupants. The forward vehicle-inside view point Vdf corresponds to an example of a vehicle-inside view point Vd, which is a virtual view point VP placed inside the vehicle room. The position of the forward vehicle-inside view point Vdf may be also placed at a position deviated from the estimated position of the driver's eyes. For example, the forward vehicle-inside view point Vdf may be also placed at a position deviated from the estimated position of the driver's eyes by a predetermined amount toward the assistant driver's seat, such as at a position between the driver's seat and the assistant driver's seat.

The rearward vehicle-inside view point Vdb is such a virtual view point VP that the position of the view point is rearward of the eyellipse by a predetermined distance and, also, the sight direction thereof is oriented rearward and obliquely downward. This rearward vehicle-inside view point Vdb can be employed, when a road surface near the vehicle rear wheels is displayed, during rearward travelling of the vehicle, for example. With the rearward vehicle-inside view point Vdb, it is possible to display the vicinity of the rear wheels, more largely. As a result thereof, the driver is enabled to easily recognize the states of the rear wheels and the vicinity of the rear bumper, during rearward travelling, similarly to during forward travelling. The rearward vehicle-inside view point Vdb also corresponds to an example of a vehicle-inside view point Vd. The position of the rearward vehicle-inside view point Vdb in itself may be the same as the position of the forward vehicle-inside view point Vdf. The forward vehicle-inside view point Vdf corresponds to a first vehicle-inside view point, and the rearward vehicle-inside view point Vdb corresponds to a second vehicle-inside view point.

Besides, the virtual view point VP may be made settable at various positions inside the vehicle room. For example, as the virtual view point VP, it is possible to employ a pattern of placing the position of a view point near a side mirror, a setting pattern of placing the position of a view point at the center of the ceiling portion inside the vehicle room, and the like.

Besides, the display control unit F6 determines whether the direction of travelling of one's subject vehicle is the forward direction or the rearward direction, based on signals from the shift sensor or the direction of rotations of the tires, for example. The display control unit F6 may also determine whether a travelling environment is off-road, based on input signals from the travelling-mode switch.

The image output unit F7 convers images inputted from the display control unit F6 into picture signals of a predetermined signal format and, then, outputs the picture signals to the display 3, thereby causing the display 3 to display the images. Thus, a synthetic image showing the periphery of one's subject vehicle which is viewed from the virtual view point VP is displayed on the display 3.

<Regarding a Method for Forming a Synthetic Image>

Hereinafter, there will be described an example of operations of the synthetic-image formation unit F5 for forming a synthetic image, with reference to a flow chart illustrated in FIG. 6. In this case, the processing for forming a synthetic image generally includes the steps of steps S101 to S106, however this processing is not limited thereto. The number of steps included in the processing for forming a synthetic image, and the order of processing therein can be properly changed. The processing illustrated in FIG. 6 can be successively executed, while photographing is performed with the respective cameras 2 or while a mode for displaying a synthetic image is set. For example, the image synthesizing processing illustrated in FIG. 6 can be repeatedly executed, at a cycle of 1/30 second. In cases of repeatedly executing the processing, it is possible to execute the processing in such a way as to reuse portions of the result of previous processing which can be reused therein, thereby properly changing the processing for reducing the processing load.

At first, in a step S101, the camera-image synthesizing unit F51 acquires data (the values of respective pixels) included in respective camera images inputted from the image acquisition unit F1 and, further, projects it onto a projection surface TS in a virtual 3D space. The respective camera images and the positions at which the respective camera images are projected onto the projection surface TS have been preliminarily associated with each other, with correspondence information such as a table data. The correspondence information such as a table data corresponds to data indicating on which positions on the projection surface TS respective pixels included in respective camera images are projected.

For example, the camera-image synthesizing unit F51 projects image data from the front camera 2F onto a forward region tsF in the projection Surface TS and, further, projects image data from the rear camera 2B onto a rearward region tsB in the projection Surface TS. The camera-image synthesizing unit F51 projects image data from the left-side camera 2L onto a left-side region tsL in the projection Surface TS and, further, projects image data from the right-side camera 2R onto a right-side region tsR. For overlapping regions, which are regions photographed redundantly by two cameras, it is possible to employ a methodology for blending images captured by two cameras at a predetermined ratio, or a methodology for coupling images captured by two cameras with each other at a predetermined border line.

Next, in a step S102, the camera-image synthesizing unit F51 extracts an image of the portion at which the vehicle region R0 is estimated to be positioned, from past image data stored in the image memory M1. Further, the camera-image synthesizing unit F51 performs rotational corrections and the like on the extracted image and, then, projects it onto the vehicle region R0. Since the image to be projected onto the vehicle region R0 is an image of the region positioned currently just beneath one's subject vehicle, namely an image of the region under the floor, this image will be also referred to as an under-floor image, hereinafter.

Figure 7:
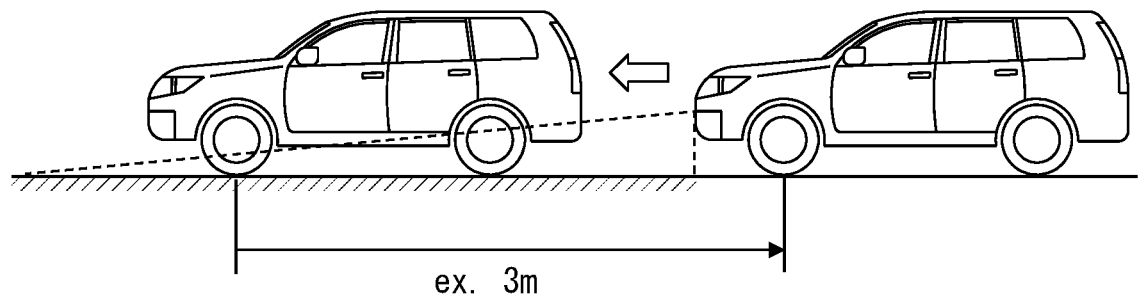
FIG. 7 is a view for explaining image data for use in forming an under-floor image.

For example, when one's subject vehicle is travelling forward, as illustrated in FIG. 7, an under-floor image is formed, using an image captured by the front camera 2F rearward of the current position by 3 m. When one's subject vehicle is travelling rearward, an under-floor image is formed, using a rear-camera image captured forward of the current position by 3 m. Namely, an under-floor image is formed, using an image of when one's subject vehicle is positioned at a position at a predetermined distance from the current position in the opposite direction from the direction of travelling. When one's subject vehicle is travelling forward, an under-floor image may be formed, using front-camera images captured at a plurality of time points until one's subject vehicle reaches the current position from when one's subject vehicle is positioned rearward of the current position by 3 m. The same can be applied, when the vehicle is travelling rearward. The image data projected on the vehicle region R0 (in other words, the under-floor portion) may be updated any time along with travelling of the vehicle Hv.

The synthetic image showing the projection surface TS viewed from a virtual view point VP, which is formed in the steps S101 or S102, corresponds to an external-world image, which is an image of the external world of the vehicle Hv which is viewed from the virtual view point VP. The external-world image corresponds to an image which does not include guide lines which will be described later and an image of the vehicle Hv, in a synthetic image as a periphery image.

In a step S103, the vehicle-image provision unit F52 places various types of CG (Computer Graphics) indicating the range of existence of the vehicle and the like, at predetermined positions in a 3D space including the projection surface TS. CGs may be also referred to as CGIs (Computer Generated Imagery). For example, in the step S103, the vehicle-image provision unit F52 places an untransparent floor image Pf indicating the region in which the vehicle bottom portion exists, above the vehicle region R0. The floor image Pf, which is an image masking the under-floor image, can be placed in such a way as to be superimposed just on the under-floor image. Further, in the step S103, a vehicle border line Lvc indicating a road-surface range in which the vehicle body (actually, the vehicle bottom portion) exists, and a tire border line Lt indicating a road-surface range in which the tires exist are placed on the vehicle region R0. The vehicle border line Lvc, which is a line indicating the outline of the region of a vertical projection of the vehicle body on the road surface, corresponds to a line indicating the outer shape of the vehicle Hv at a bird's-eye view point. The tire border line Lt, which is similarly a line indicating the outline of the region of a vertical projection (namely, an orthogonal projection) of the tires on the road surface, corresponds to a line indicating the outline of the tires at a bird's-eye view point.

The color of the vehicle border line Lvc can be properly changed, and can be set to be a blue color, such that it can be easily distinguished from the actual color of the road surface, for example. The color of the vehicle border line Lvc is set in such a way as to improve the visibility of the vehicle border line Lvc for the driver, in consideration of the colors of various road surfaces. The color of the tire border line Lt is set to be a different color from that of the vehicle border line Lvc. For example, the color of the tire border line Lt can be set to be a yellow color or an orange color.

Besides, in the step S103, the vehicle-image provision unit F52 may also draw an image of a rectangular shape indicating the grounding portions of the tires or a contour line of the grounding portions of the tires, as a grounding-region image, as other image elements relating to the vehicle Hv. The vehicle-image provision unit F52 may also draw an expected orbit line as a line indicating an expected travelling orbit according to the steering angle and the turning angle of the vehicle Hv. The vehicle-image provision unit F52 may also draw a scale line indicating ground points at predetermined distances from the vehicle end portion, and a vehicle-width line indicating the vehicle width. The vehicle border line Lvc and the tire border line Lt are images indicating information about the vehicle Hv and, therefore, may be also referred to as vehicle information images. The expected orbit line, the scale line and the vehicle width line can also function as information for guiding driver's driving manipulations. Therefore, the displayed lines such as the expected orbit line may be also referred to as guide lines or assist lines. Such guide lines may include the vehicle border line Lvc and the tire border line Lt. This step S103 may be also referred to as a drawing step.

In a step S104, the vehicle-image provision unit F52 places various CGs indicating the external appearance of the vehicle and interior members, at predetermined positions in the 3D space including the projection surface TS. More specifically, the vehicle-image provision unit F52 places various 3D models regarding one's subject vehicle, in the virtual 3D space including the projection surface TS, on which the camera images have been projected. For example, 3D models of interior members, such as an instrument panel, a handle, a room mirror, seats and pillars, are placed at predetermined positions in the 3D space including the projection surface TS. Further, 3D models indicating the external appearance of the vehicle, such as tires and a body, are also placed. Such 3D models of the vehicle and respective constituent members may be also referred to as objects or stereoscopic images. The display control unit F6 can change the transparency, and the placement/non-placement of the respective 3D objects.

In a step S105, the synthetic-image formation unit F5 sets a virtual view point VP in the 3D space including the projection surface TS, by being controlled by the display control unit F6. The synthetic-image formation unit F5 can set a virtual view point VP oriented in an arbitrary field-of-view direction, at an arbitrary view-point position in the 3D space. The step S105 may be also executed before the step S101 or the step S104.

In a step S106, the synthetic-image formation unit F5 performs rendering corresponding to the virtual view point VP, on the various types of image elements existing in the 3D space including the projection surface TS and, further, cuts out image elements included in a predetermined viewing angle when viewed from the virtual view point VP. Thus, the synthetic-image formation unit F5 forms a synthetic image as a periphery image viewed from the virtual view point VP.

For example, when the forward bird's-eye view point Vbf is set as the virtual view point VP, a synthetic image showing the vehicle and the peripheral region around the vehicle is formed, in such a way as to look down on one's subject vehicle from the sky above and obliquely rearward of the vehicle. When the forward vehicle-inside view point Vdf is set as the virtual view point VP, a synthetic image is formed as a forward vehicle-inside view point image PDf, such that the synthetic image shows the ground surface near the front wheels, in such a way as to pass transparently through the bottom portion, the interiors and the body of the vehicle Hv. When the rearward vehicle-inside view point Vdb is set as the virtual view point VP, a rearward vehicle-inside view point image PDb is formed, wherein the rearward vehicle-inside view point image PDb is a synthetic image showing the ground surface near the rear wheels, in such a way as to pass transparently through the bottom portion of the vehicle. Such synthetic images showing the road surface by passing transparently through the vehicle-body bottom portion, such as the forward vehicle-inside view point image PDf and the rearward vehicle-inside view point image PDb, can be referred to as under-floor transparence images or under-floor recognition images.

Figure 6:
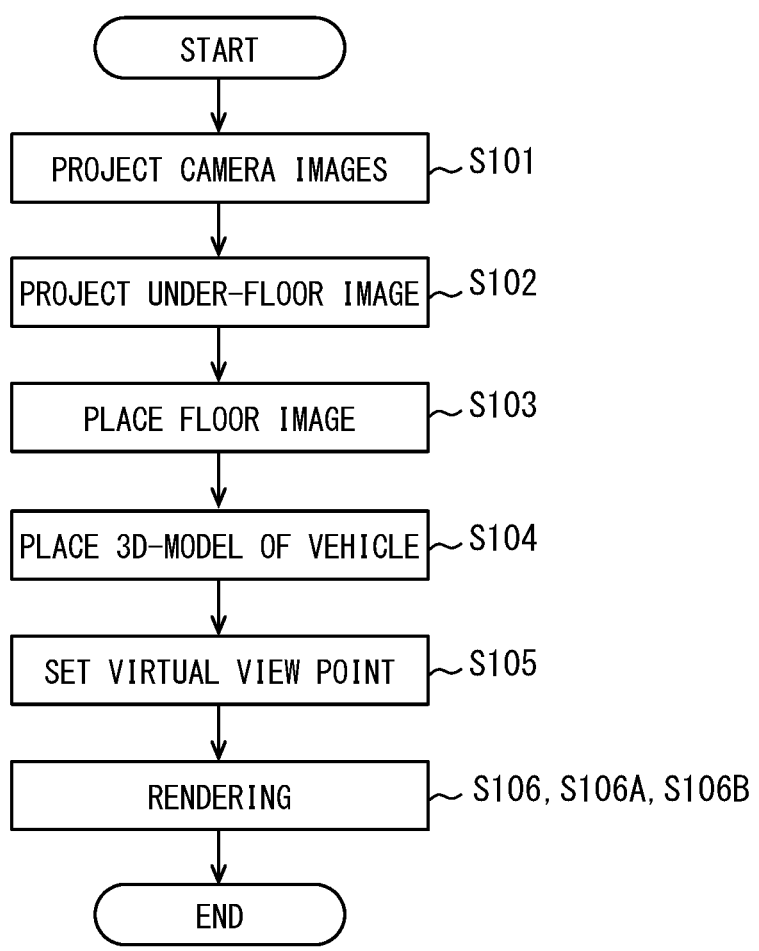
FIG. 6 is a flow chart illustrating an example of procedure for forming a synthetic image.

FIG. 6 illustrates S106A, which indicates the step S106 in cases of forming a vehicle-inside view point image PD, such as a forward vehicle-inside view point image PDf and a rearward vehicle-inside view point image PDb. The step S106A can be referred to as a vehicle-inside view point image forming step. A vehicle-inside view point image PD is a synthetic image showing the road-surface region positioned in a blind spot behind an interior member when viewed from a vehicle-inside view point, in such a way as to pass transparently through the interior member. A vehicle-inside view point image PD may be either a synthetic image including an untransparent floor image Pf or an under-floor transparence image including a transparent floor image Pf.

The synthetic-image formation unit F5 is configured to form a synthetic image showing interior members in an untransparent state or a semi-transparent state, under the control of the display control unit F6. For example, the synthetic-image formation unit F5 is configured to form a synthetic image which shows images of interior members in a vehicle-inside view point image PD in an untransparent or semi-transparent state, as an interior-added image PDi. Such an interior-added image PDi corresponds to an image formed by superimposing images of interior members on a vehicle-inside view point image PD. Interior-added images PDi include forward interior-added images PDif including interior images taken from the forward vehicle-inside view point Vdf and rearward interior-added images including interior images taken from the rearward vehicle-inside view point Vdb. Various types of interior-added images PDi can be formed by adjusting the transparency of the 3D models of various interior members, which are drawn in the step S104, for example.

The aforementioned method for forming a synthetic image is an example, and it is not necessary to determine the values of all the pixels in the projection surface TS, when actually forming a synthetic image. For example, it is also possible to form a synthetic image, using only the pixel values within a required range corresponding to the set virtual view point VP, out of the plurality of camera images. It is also possible to change the combination of 3D models placed therein, according to the position of the virtual view point VP. For example, it is possible to eliminate the drawing of the 3D models of interior members, when the virtual view point VP exists outside the vehicle room. When the virtual view point VP is placed inside the vehicle room, it is possible to eliminate the drawing of the 3D models of the body and the like which form the vehicle outer surfaces. When the forward vehicle-inside view point Vdf with a line of sight oriented forward of the vehicle is set as the virtual view point VP, it is also possible to eliminate the drawing of images of interior members rearward of the driver's seat, such as rear seats. By eliminating the drawing of images outside the displayed range, it is possible to increase the processing speed or reduce the processing load.

There has been described an aspect where a synthetic image is formed in such an order that camera images are projected onto the projection surface TS and, thereafter, various types of CGs about the vehicle Hv are added thereto, as an example. However, the respective processing may be also executed in parallel. It is possible to employ various methods, as a method for forming a synthetic image. It is also possible to place an external-world image formed from a combination of the plurality of camera images, and images of stereoscopic models of members constituting the vehicle in respective different layers and, further, it is possible to perform processing thereon individually.

Figure 8:
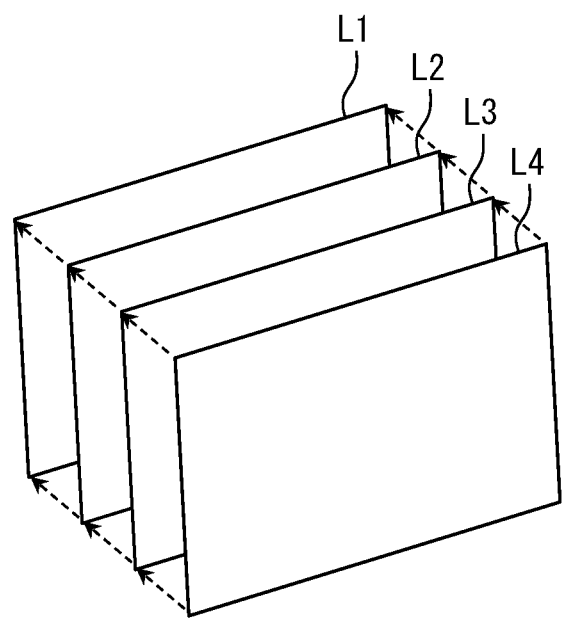
FIG. 8 is a view illustrating an example of the structure of a synthetic image.

For example, as illustrated in FIG. 8, a synthetic image may be formed by combining a camera-image layer L1, a floor-image Pf layer L2, a guide-line layer L3, and a vehicle-image layer L4 with each other. The camera-image layer L1 is a layer for drawing, thereon, an external-world image which is an image of the projection surface TS on which camera images and image data stored in the image memory M1 have been projected, which is viewed from a virtual view point VP. The external-world image includes an under-floor image. The floor-image Pf layer L2 is a layer for placing an untransparent floor image Pf thereon. The guide-line layer L3 is a layer for drawing guide lines such as a vehicle border line Lvc thereon.

The vehicle-image layer L4 is a layer for drawing, thereon, CGs of the vehicle external appearance or various constituent members which are viewed from the virtual view point VP. CGs of tires may be provided separately from a layer for placing CGs of interior members thereon. In this case, a layer for drawing the CGs of the tires thereon may be placed between the guide-line layer L3 and the layer for placing the CGs of the interior members thereon. For convenience, the CGs of the vehicle external appearance and the CGs of various constituent members are comprehensively designated as vehicle CGs. The vehicle CGs conceptually include CGs of interior members such as the instrument panel, CGs of the tires and the like, as well as CGs indicating the vehicle external appearance. The CGs of interior members are also referred to as interior images. The CGs of tires are also referred to as tire images.

In cases of forming a synthetic image by integrating a plurality of layers as described above, the camera-image layer L1 may be set as a lowermost-side (background-side) layer, and the floor-image Pf layer L2, the guide-line layer L3, and the vehicle-image layer L4 may be superimposed thereon in the mentioned order. As a matter of course, the layer structure may be also changed as required. In cases of individually treating the respective image elements using the plurality of layers, the respective layers are integrated to form an image, which finally forms a synthetic image. The transparency may be adjusted for each layer or for each image object. For example, by adjusting the transparency of the vehicle-image layer L4, it is possible to change a forward interior-added image PDif to a forward vehicle-inside view point image PDf.

<Regarding Changeover Between Operation Modes>

The image formation ECU 1 has operation modes corresponding to respective virtual view points VP, as operation modes. Namely, the image formation ECU 1 has a forward vehicle-inside view point mode, a rearward vehicle-inside view point mode, a forward bird's-eye view point mode, and a rearward bird's-eye view point mode, and the like. The forward vehicle-inside view point mode is an operation mode for displaying a forward vehicle-inside view point image PDf as a synthetic image which is taken from the forward vehicle-inside view point Vdf. The rearward vehicle-inside view point mode is an operation mode for displaying a rearward vehicle-inside view point image as a synthetic image which is taken from the rearward vehicle-inside view point Vdb. The forward bird's-eye view point mode is an operation mode for displaying a forward bird's-eye view point image PBf as a synthetic image which is taken from the forward bird's-eye view point Vbf. The rearward bird's-eye view point mode is an operation mode for displaying a rearward bird's-eye view point image as a synthetic image which is taken from the rearward bird's-eye view point Vbb. Operation modes for displaying a synthetic image taken from a vehicle-inside view point, such as the forward vehicle-inside view point mode and the rearward vehicle-inside view point mode, are referred to as vehicle-inside view point modes. Operation modes for displaying a synthetic image taken from a virtual view point VP placed outside the vehicle room, such as the forward bird's-eye view point mode and the rearward bird's-eye view point mode, are also referred to as vehicle-outside view point modes. The bird's-eye view point modes are included in the vehicle-outside view point modes.

The image formation ECU 1 further has operation modes for displaying an image from each camera 2 as a main image on the display 3, such as a front-camera mode for displaying an image from the front camera 2F, and a rear-camera mode for displaying a rear-camera image.

The image formation ECU 1 further has a standby mode for displaying no periphery image, in addition to the operation modes corresponding to the respective virtual view points VP and the respective cameras 2. When the image formation ECU 1 is in the standby mode, images other than periphery images, such as map images formed by a navigation system or images formed by an audio system, are displayed on the display 3. The standby mode corresponds to a mode for not outputting picture signals corresponding to periphery images to the display 3. For convenience, the operation modes other than the standby mode, namely the modes for displaying periphery images, are also referred to as periphery-image display modes.

Changeovers between these operation modes are performed through the control by the display control unit F6, according to user's manipulations on the touch panel 4 and the manipulation button 5, and according to the conditions of travelling of the vehicle. The conditions of travelling of the vehicle in themselves are also changed, based on user's manipulations on the manipulation components, such as the shift lever and the brake pedal. User's manipulations on the vehicle include manipulations on various devices incorporated in the vehicle and, for example, include manipulations on the shift lever and the brake pedal, besides manipulations on the touch panel 4 and the manipulation button 5.

When a predetermined periphery-image display condition is satisfied, the image formation ECU 1 is changed over to a last-validated operation mode (so-called a last mode), out of the periphery-image display modes corresponding to the direction of travelling of one's subject vehicle. Last-mode information is stored in the RAM 12, the storage 13 or the like.

For example, when the shift position is set to be a forward-travelling position, a last-validated operation mode is activated, out of the front-camera mode, the forward bird's-eye view point mode, and the forward vehicle-inside view point mode. In this case, the forward travelling position is a position for transmitting torque from a driving source in such a direction as to cause the vehicle to travel forward. Such forward travelling positions include "D", "S", "B", "1", "2", "L" positions and the like. For example, when the periphery-image display condition is satisfied, when the shift position is the "D" position, in the standby mode, the forward vehicle-inside view point mode is set.

When the shift position is set to be a rearward-travelling position, a last-validated operation mode is activated, out of the rear-camera mode, the rearward bird's-eye view point mode, and the rearward vehicle-inside view point mode. The rearward travelling position is a position for transmitting the torque from the driving source in such a direction as to cause the vehicle to travel rearward. The rearward travelling position corresponds to so-called an "R" position.

The periphery-image display condition includes that the shift position is set to be other than a parking position and a neutral position, and the vehicle speed is lower than a predetermined low-speed threshold value. The low-speed threshold value can be 10 km/h, 15 km/h, 20 km/h or the like, for example. The parking position is a position for locking the transmission and corresponds to so-called a "P" position. The neutral position is a position for interrupting the torque transmission between an input and an output shaft, in other words, a position for not transmitting the torque from the driving source to a driving wheel and the like. The neutral position corresponds to so-called an "N" position.

The periphery-image display condition can be that the aforementioned conditions regarding the shift position and the vehicle speed are satisfied and, also, the manipulation reception unit F2 has detected that the user has performed a manipulation for displaying a periphery image. For example, such user's manipulations for displaying a periphery image include user's pushing of the manipulation button 5, user's touching manipulations on an area which displays a button for displaying a periphery image, and the like. Changeovers between the respective image display modes can be performed by pushing the manipulation button 5 and the like. If the periphery-image display condition is no longer satisfied, the operation mode of the image formation ECU 1 is returned to the standby mode. The image formation ECU 1 is capable of changing over the display screen of the display 3, based on output signals from the various manipulation components incorporated in the vehicle, which include the touch panel 4, the shift lever and the like.

<Displaying of Animation>

With the structure configured to display periphery images taken from various view points as in the present disclosure, the user is allowed to view pictures at desired view points, which improves the usability. On the other hand, since periphery images taken from the increased view points can be displayed, an issue is induced as follows. That is, when the content displayed on the display has been changed over to a periphery image, the user finds it hard to intuitively understand from which view point the periphery image being displayed is taken. Particularly, in cases of vehicle-inside view point images PD such as forward vehicle-inside view point image PDf and rearward vehicle-inside view point images PDb, the user cannot easily recognize in which direction the periphery image being displayed is taken.

For coping therewith, the image formation ECU 1 according to the present embodiment is configured to display animation which includes scenes showing a virtual view point VP moving continuously from a predetermined start point to a targeted vehicle-inside view point, when changing over from an operation mode other than the vehicle-inside view point modes to a vehicle-inside view point mode. Such an operation mode other than the vehicle-inside view point modes is the standby mode or a bird's-eye view point mode, for example. In this case, "animation" can be rephrased as moving images. Hereinafter, "a target view point" or "a last view point" will designate a view point in a final display screen.

Figure 9:
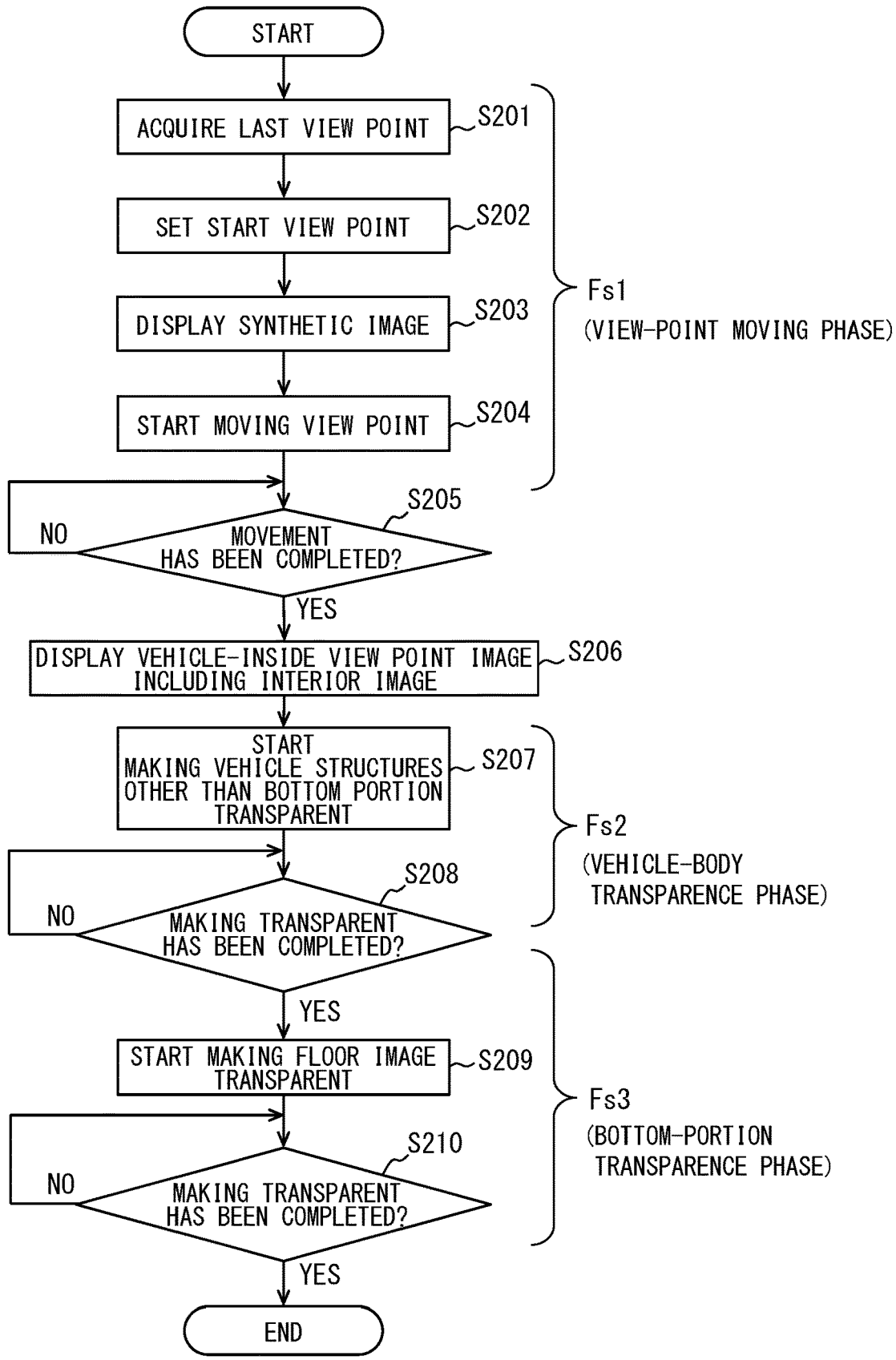
FIG. 9 is a flow chart illustrating operations of the image formation ECU for displaying a forward vehicle-inside image.

FIG. 9 is a flow chart illustrating a series of processing executed as display changeover processing by the image formation ECU 1 when a synthetic image taken from a vehicle-inside view point is displayed. The flow chart illustrated in FIG. 9 is executed at the time of changeover from the standby mode to a vehicle-inside view point mode, such as the forward vehicle-inside view point mode or the rearward vehicle-inside view point mode. The display changeover processing according to the present embodiment includes steps S201 to S210, for example. As a matter of course, the number of steps constituting the display changeover processing, and the order of processing therein may be changed as required.

In general, the display changeover processing according to the present embodiment may be divided into a view-point moving phase Fs1, a vehicle-body transparence phase Fs2, and a bottom-portion transparence phase Fs3. The view-point moving phase Fs1 is a phase for moving a virtual view point to a last view point, from a start position defined according to the last view point. The vehicle-body transparence phase Fs2 is a phase for gradually raising the transparency of vehicle CGs of the instrument panel and the like, up to a predetermined level, after the completion of the movement to the last view point. The bottom-portion transparence phase Fs3 is a phase for gradually rendering the floor image Pf transparent such that it is completely transparent at last.

Each phase is set to be completed in about 0.5 to 1.5 seconds, such as in 1 second, for example. As a matter of course, the lengths of the respective phases may be settable by the user. Images displayed in each phase are displayed, as a series of animation, on the display 3. In this case, "phases" may be also rephrased as scenes. Further, "phases" may be programmatically regarded as integration of processing. Therefore, the view-point moving phase Fs1, the vehicle-body transparence phase Fs2, and the bottom-portion transparence phase Fs3 may be also referred to as view-point moving processing, vehicle-body transparence processing, and bottom-portion transparence processing, respectively.

Hereinafter, operations of the image formation ECU 1 will be described, by exemplifying a case of changing over from the standby mode to the forward vehicle-inside view point mode.

At first, in a step S201, the display control unit F6 sets a last view point, which is a final virtual view point VP according to the operation mode, and the processing shifts to a step S202. For example, in cases of changing over to the forward vehicle-inside view point mode, the forward vehicle-inside view point Vdf is set as the last view point VL. This step S201 may be also referred to as a last view-point setting step.

In the step S202, the display control unit F6 sets a start view point VS in animation, according to the last view point VL. For example, when the last view point VL is the forward vehicle-inside view point Vdf, the forward bird's-eye view point Vbf is set as the start view point VS. When the last view point VL is the rearward vehicle-inside view point Vdb, the rearward bird's-eye view point Vbb is set as the start view point VS. After the completion of this step S202, the processing shifts to a step S203.

In the step S203, the synthetic-image formation unit F5 forms a synthetic image corresponding to the start view point VS, and the display control unit F6 causes the display 3 to display this synthetic image. For example, in cases of changing over to the forward vehicle-inside view point mode, a forward bird's-eye view point image is displayed at the beginning of the animation. The step S203 corresponds to a step of displaying a bird's-eye image corresponding to the start view point VS. After the completion of this step S203, the processing shifts to a step S204.

Figure 10:
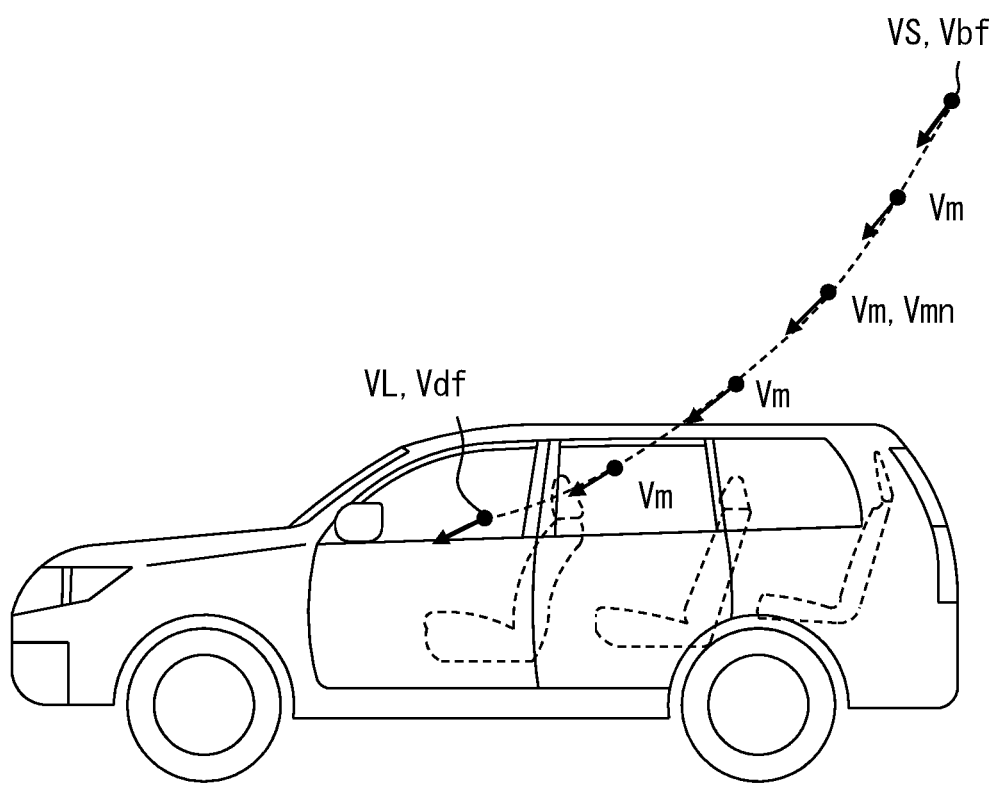
FIG. 10 is a view illustrating an example of a movement path of a virtual view point up to a forward vehicle-inside view point.

The step S204 is starting processing for stepwisely and continuously moving the virtual view point VP from the forward bird's-eye view point Vbf as the start view point VS toward the forward vehicle-inside view point Vdf as the last view point VL, as illustrated in FIG. 10, for example. A step S205 is a step of determining whether or not the virtual view point has been moved to reach the forward vehicle-inside view point Vdf as the last view point VL. When the virtual view point VP has reached the last view point VL (YES in S205), a synthetic image is displayed (step S206), wherein this synthetic image includes images of interior members, such as the instrument panel, which are viewed from the forward vehicle-inside view point Vdf as the last view point VL. The steps S201 to S206 correspond to the view-point moving phase Fs1 and the view-point moving processing.

During the stage for moving the virtual view point VP, the synthetic-image formation unit F5 successively forms synthetic images each showing the virtual view point VP moved by an amount corresponding to a single frame, toward the view point as the destination of movement, under the control of the display control unit F6. The view-point position and the sight direction of a midway view point Vm, which is the virtual view point VP during the movement of the view point, can be derived through linear interpolation, based on the position and the sight direction of the start view point VS, the position and the sight direction of the last view point VL, and the number of frames of synthetic images used for the view-point movement scenes. As described above, the synthetic-image formation unit F5 forms, continuously with time, synthetic images showing the virtual view point VP stepwise getting closer to the last view point VL from the start view point VS. The plurality of formed synthetic images are outputted, in order, to the display 3, by the display control unit F6. Thus, the plurality of synthetic images showing the virtual view point VP at different positions, which have been formed by the synthetic-image formation unit F5, are displayed as continuous animation showing the view point moving from the start view point VS to the last view point VL.

The speed of movement of the virtual view point VP can be made constant. The speed of movement of the virtual view point VP may be also set to increase at a constant acceleration. The speed of movement of the virtual view point VP may be also set to decrease as the virtual view point VP gets closer to the last view point VL. The speed of movement of the virtual view point VP may be also controlled by combining the aforementioned aspects, for example, such that the speed increases at a constant acceleration and, thereafter, the speed decreases at a constant acceleration. The display control unit F6 can control the position of the virtual view point VP and the aspect of movement thereof.

During the stage for moving the virtual view point VP inside the vehicle room, the interior images of the instrument panel and the like are drawn and displayed in an untransparent state or a semi-transparent state, in order to allow the user to view these structures. Namely, in scenes showing the virtual view point VP existing inside the vehicle room, the images displayed therein are images formed by superimposing the interior images taken from the virtual view point VP on an external-world image taken from the virtual view point VP. Since the interior images are displayed in an untransparent or semi-transparent state, the user can easily recognize the position and the direction of the view point, by intuition.

In this case, "semi-transparent" is not limited to a state of having a transparency of 50% and may also include a state of having a transparency of 30% or a state of having a transparency of 80%. The expression "semi-transparent" may also include such a level as to vaguely express the presence of the structures. The transparency is such a parameter that the higher the value thereof, the more transparent state it indicates. A state of having a transparency of 100% corresponds to a completely-transparent state, and a state of having a transparency of 0% corresponds to a completely-untransparent state. The transparency or the untransparency of image elements conceptually corresponds to the alpha values of pixels. The alpha values can be set in 256 levels, on a scale of 0 to 255, for example. In general, such an alpha value is used, in many cases, such that the smaller the value thereof, the higher the degree of transparency is. In such cases, making the transparency higher corresponds to making the alpha values smaller.

It is also possible to change the combination of interior members displayed, and the respective transparencies of the individual interior members, according to the position of the virtual view point. For example, when the midway view point exists rearward of the front seats inside the vehicle room, it is possible to display an image of the backrest portions of the front seats which are placed in a semi-transparent state. The image of the backrest portions is placed in such a way as to be superimposed on the images of the instrument panel and the like. With this structure, it is expected that the user can intuitively recognize the position of the moving virtual view point.

Figure 11:
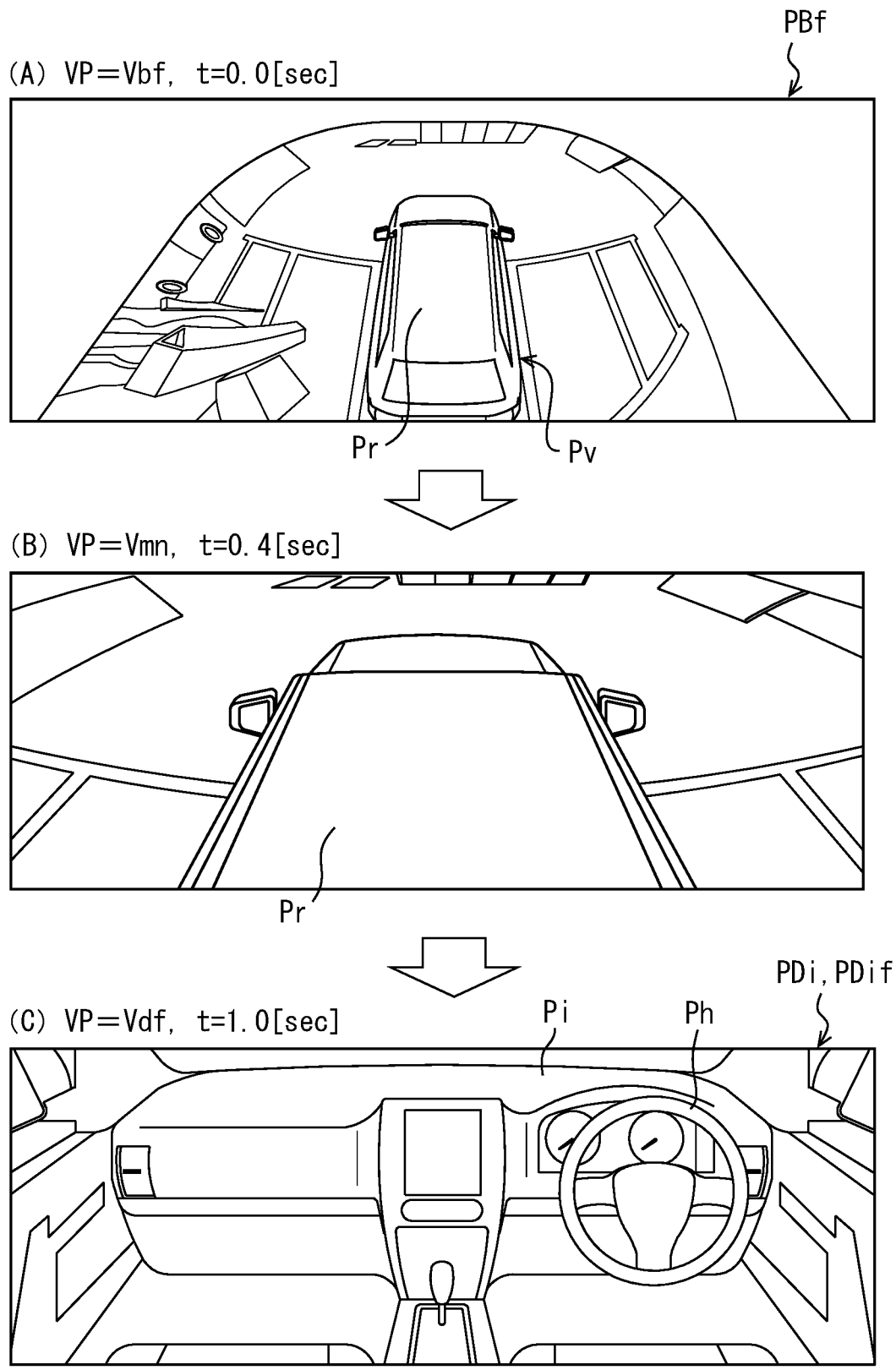
FIG. 11 is a view illustrating an example of transitions of a display screen during a view-point moving phase.

FIG. 11 illustrates transitions of the display screen during the view-point moving phase, in a case of changing over to the forward vehicle-inside view point mode. When the changeover to the forward vehicle-inside view point mode has been performed, as illustrated in (A) in FIG. 11, at first, a forward bird's-eye view point image PBf is displayed, as the start view point VS. Thereafter, the view point gradually descends toward the vehicle from the forward bird's-eye view point Vbf, then enters the vehicle room and reaches the forward vehicle-inside view point Vdf. (B) in FIG. 11 illustrates a displayed image at a midway view point Vmn in FIG. 10, for example. (C) in FIG. 11 illustrates a displayed image immediately after the virtual view point VP reached the forward vehicle-inside view point Vdf. In FIG. 11, "t" indicates an example of the time elapsed since the start of displaying of the animation.

As illustrated in (A) in FIG. 11, in the forward bird's-eye view point image PBf, vehicle images Pv which are CGs indicating the external appearance of the vehicle, and images showing the periphery thereof are displayed. In the figure, "Pr" designates an image of the roof portion of the vehicle Hv, out of the vehicle images Pv. As the virtual view point VP gets closer to the vehicle, the roof-portion image Pr is displayed more largely on the display screen. As illustrated in (C) in FIG. 11, when the virtual view point VP has reached the forward vehicle-inside view point Vdf as the last view point VL, CGs of constituent members are displayed in such a way as to be superimposed on an external-world image, wherein the CGs of the constituent members indicate that the view point is oriented forward of the vehicle. The CGs of the constituent members which indicate that the view point is oriented forward of the vehicle are, for example, an instrument-panel image Pi, a handle image Ph, images of the seating surfaces and the backrest portions of front seats, an image of a center console, and the like.

Next, as a step S207, the synthetic-image formation unit F5 starts processing for stepwise increasing the transparency of the vehicle CGs other than the floor image Pf, at a predetermined speed, under the control of the display control unit F6. Namely, the synthetic-image formation unit F5 starts making the interior images transparent. More specifically, the transparency of the instrument-panel image Pi, the handle image Ph and the like is gradually increased, from an untransparent state to a completely-transparent state, for example.

At timing when a predetermined time period (for example, 0.5 second) has elapsed since the start of making the interior images transparent, the transparency of the tire image Pt is also stepwise increased from 0% to a predetermined target level, at a predetermined speed. By providing a time difference between the start of making the interior images transparent and the start of making the tire image Pt transparent, as described above, it is possible to realize animation expression which displays the tire image Pt along with the start of making the interior images transparent and, thereafter, gradually makes this tire image Pt transparent. With the structure which provides a time difference between the start of making the interior images transparent and the start of making the tire image Pt transparent, as described above, it can be expected that the user is given such visual impression that members closer to the vehicle-inside view point Vd as the last view point VL disappear earlier. This can result in improvement of the attraction of the product, namely the merchantability.

A step S208 is a step of determining whether or not the adjustment of the transparency of the images such as the interior images and the tire image Pt, other than the floor image Pf, has been completed. The steps S207 to S208 correspond to the vehicle-body transparence phase Fs2 and the vehicle-body transparence processing. At the time point of the completion of the step S208, the final transparency of the tire image Pt may be such that the tire image Pt is completely transparent. Also, the final transparency of the tire image Pt may be made only about 60% to 80%, in order to allow the user to recognize the presence thereof. After the completion of the adjustment of the transparency of the members other than the vehicle bottom portion, the processing shifts to a step S209. At the time point of the completion of the vehicle-body transparence phase, the displayed image is an image showing the periphery of the vehicle in such a way as to transparently pass the vehicle body such as the engine room and the door panels, while hiding the under-floor portion with the floor image Pf.

Figure 12:
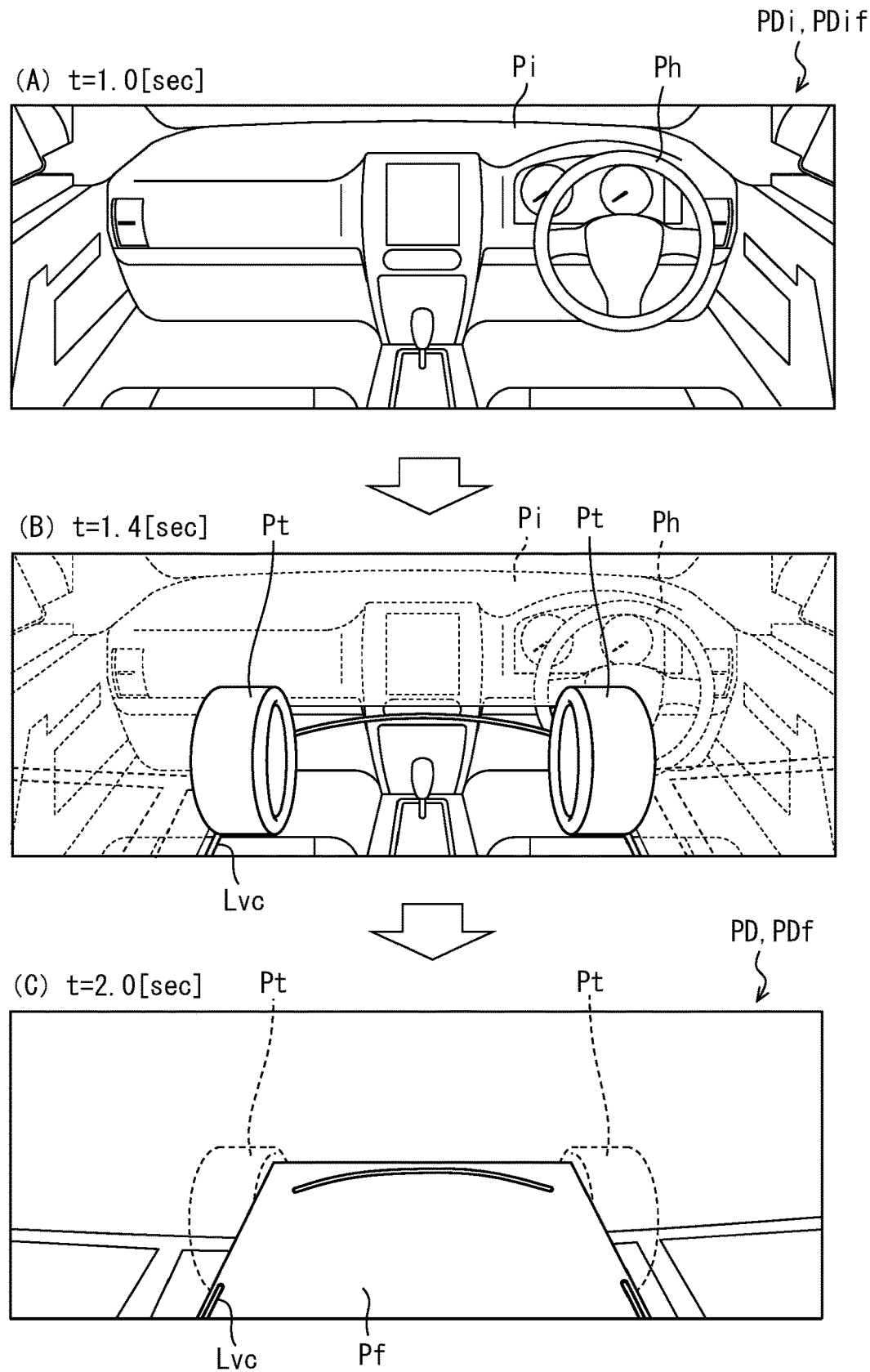
FIG. 12 is a view illustrating an example of transitions of the display screen during a vehicle-body transparence phase.

FIG. 12 illustrates transitions of the display screen during the vehicle-body transparence phase, in the case of changing over to the forward vehicle-inside view point mode. In FIG. 12, semi-transparent members are expressed by broken lines. During the vehicle-body transparence phase, as illustrated in (A) to (B) in FIG. 12, the interior images such as the instrument-panel image Pi and the handle image Ph are made transparent, at first. Along therewith, the tire image Pt, the floor image Pf and the like start to be displayed, as illustrated in (B) in FIG. 12. Further, as the interior images are made transparent, guide lines, such as a vehicle border line Lvc placed closer to the background than the interior images, start to be displayed.

(C) in FIG. 12 illustrates the display screen at the time of the completion of the vehicle-body transparence phase. At the time point of the completion of the vehicle-body transparence phase, a periphery image including the floor image Pf and the vehicle border line Lvc is displayed. In this case, as an example, it is assumed that the final transparency of the tire image Pt at the time point of the completion of the step S208 is set to be about 80%. This is for giving an impression that a tire border line Lt to be displayed thereafter is a frame line indicating the tire positions.

At the time point of the completion of the vehicle-body transparence phase, the tire image Pt may be formed only from an untransparent or semi-transparent contour line. Namely, the portions thereof other than the tire contour line may be made colorless and transparent. Further, the tire image Pt may be also made completely transparent, similarly to the instrument-panel image Pi and the like. It is possible to properly change the constituent members displayed at the time point of the completion of the vehicle-body transparence phase. For example, the tire image Pt may be made undisplayed, in the forward vehicle-inside view point image PDf, based on settings made by the user or the designer of the image formation ECU 1.

After the completion of the vehicle-body transparence processing (YES in S208), as a step S209, at last, the synthetic-image formation unit F5 starts processing for stepwisely raising the transparency of the floor image Pf at a predetermined speed, under the control of the display control unit F6. More specifically, the transparency of the floor image Pf is gradually raised, from an untransparent state to a completely-transparent state. If the tire image Pt still remains at the start of the step S209, the transparency of the tire image is also raised at a predetermined speed up to 100%. Thus, an under-floor image is gradually displayed and, finally, a forward vehicle-inside view point image PDf is displayed, wherein all the vehicle constituent members including the vehicle bottom portion are transparent.

Figure 13:
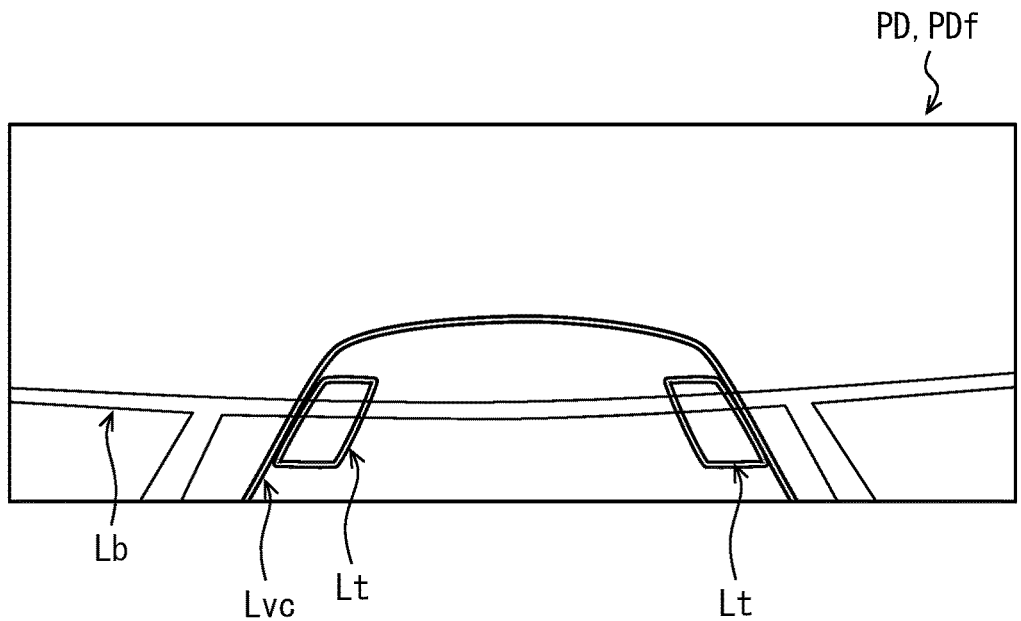
FIG. 13 is a view illustrating an example of a final forward vehicle-inside view point image.

A step S210 is a step of determining whether or not the adjustment of the transparency of the floor image Pf and the like has been completed. If the processing for making the floor image Pf and the like transparent has been completed, the step S210 results in positive determination, and the display changeover processing ends. The steps S209 to S210 correspond to the bottom-portion transparence phase Fs3 and the bottom-portion transparence processing. The finally-displayed image is an image formed by superimposing the vehicle border line Lvc, the tire border line Lt and the like, on an external-world image including the under-floor region which is taken from the forward vehicle-inside view point Vdf, as illustrated in FIG. 13, as a forward vehicle-inside view point image PDf. Namely, a periphery image is displayed, wherein the periphery image shows the forward of the vehicle and the vicinity of the front wheels which are viewed from the driver's view point or the like, in such a way as to transparently pass through the vehicle body and the bottom portion. "Lb" illustrated in FIG. 13 is a parking frame line provided on the road surface and is an example of a photographed object included in camera images.

Figure 14:
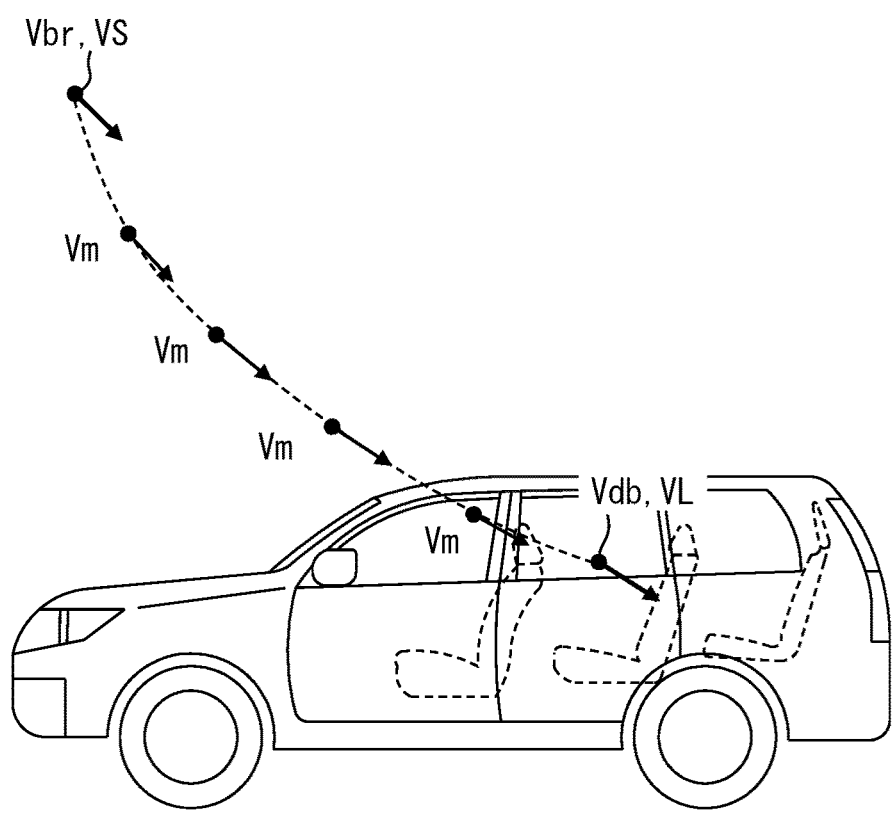
FIG. 14 is a view illustrating an example of a movement path of the virtual view point up to a rearward vehicle-inside view point.

There has been described a case of changing over to the forward vehicle-inside view point mode. On the other hand, in cases of changing over to a rearward view point, during the view-point moving phase, for example, as illustrated in FIG. 14, the view point may be gradually moved from the rearward bird's-eye view point Vbb as the start view point VS toward the rearward vehicle-inside view point Vdb as the last view point VL. When the virtual view point VP has reached the rearward vehicle-inside view point Vdb, it is preferable that interior images of rear seats, a rear window, a C pillar and the like are displayed in an untransparent state. By displaying the interior images indicating that the view point is oriented rearwardly as described above, the user is allowed to easily recognize the orientation of the virtual view point, and the like.

After the virtual view point VP has reached the rearward vehicle-inside view point Vdb, in the transparence processing, the interior images of the rear seats and the like are made transparent at a predetermined speed, then a predetermined time difference is provided thereafter and, further, the transparency of the floor image Pf and the tire image Pt corresponding to the rear wheels is stepwisely raised. As a result thereof, an image displayed as a final rearward vehicle-inside view point image PDb shows the ground surface near the rear wheels, as a photographed object, which is viewed from the rearward vehicle-inside view point Vdb, and the guide lines such as the vehicle border line Lvc and the tire border line Lt, which are superimposed thereon.

<Effects of the Aforementioned Structures>

As described above, the periphery display system Sys is configured to form and display, continuously with time, a plurality of synthetic images showing a virtual view point getting closer to the last view point VL from the start view point VS set outside the vehicle room, in cases of changing over the content displayed on the display 3 to a vehicle-inside view point image PD. Namely, the periphery display system Sys provides animation expression showing the position of the virtual view point VP moving stepwisely from the start view point VS to the last view point VL outside the vehicle room. In addition, immediately after the virtual view point has reached the last view point VL, the interior images taken from the last view point VL are displayed and, then, they are gradually made transparent.

This allows the user to easily understand from which view point the periphery image displayed finally on the display 3 is taken, with reference to the entire vehicle.

During the phase for making the vehicle images transparent, the floor image Pf, out of the various vehicle images, is made transparent at last. In other words, the floor image Pf is displayed at a level enough to be visually recognized for a predetermined time period and, thereafter, the floor image Pf is made undisplayed. With this aspect, it is possible to impress on the user the range in which the vehicle body exists, and the range in which an under-floor image based on a past camera image is displayed. This can reduce the risk of user's misrecognition of the road surface conditions under the floor and the range of the existence of the vehicle body.

In addition, with the aforementioned structure, the start view point VS is set at different positions, depending on the last view point VL. More specifically, when the last view point VL is the forward vehicle-inside view point Vdf, the forward bird's-eye view point Vbf is set as the start view point VS. When the last view point VL is the rearward vehicle-inside view point Vdb, the rearward bird's-eye view point Vbb is set as the start view point VS. Namely, the start view point VS is set at a region outside the vehicle room in the opposite side from the last view point VL, with respect to the position just above the center of the vehicle. Further, the virtual view point VP is moved toward the last view point VL from this start view point VS. With this structure, the direction of the movement of the virtual view point during the movement of the view point is substantially coincident with the sight direction of the last view point VL. This allows the user to recognize, more intuitively, in which direction the periphery image displayed finally on the display 3 is taken.

The aforementioned structure is configured to form a synthetic image showing the periphery of the vehicle, in such a way as to transparently pass through the constituent members of the vehicle Hv, such as the instrument panel and the vehicle-body bottom portion, as a synthetic image taken from a vehicle-inside view point. The synthetic image taken from the vehicle-inside view point corresponds to an image formed by superimposing the vehicle border line Lvc and the tire border line Lt on an image of a photographed object existing beneath the vehicle and at the periphery of the vehicle. By recognizing the synthetic image, the user can recognize the state around one's subject vehicle at the view point inside the vehicle room and, further, can intuitively understand the state of the periphery of one's subject vehicle.

Further, the user can easily have a sense of the distance from the vehicle body to a stereoscopic object, such as a rock, a curbstone or a flap plate, which exists near the vehicle, based on the vehicle border line Lvc included in the synthetic image. This can reduce the risk of unintentional impingement of the vehicle body on such stereoscopic objects. With the structure for providing the tire border line Lt in the synthetic image, the user can easily recognize the positions of the vehicle body and the tires, with respect to a compartment line, a curbstone, a rock and the like which are positioned under the vehicle body. This allows the user to perform detailed driving manipulations, such as placing a tire on a targeted rock, during off-road travelling, for example. Further, during on-road travelling, similarly, the user is allowed to easily perform detailed driving manipulations, such as bringing the vehicle body closer to a road edge, in order to prevent the tires from impinging on curbstones and the like.

Although embodiments of the present disclosure have been described above, the present disclosure is not limited to the aforementioned embodiments. Various modifications which will be described later are also included in the technical range of the present disclosure. Further, the present disclosure can be implemented by making, thereto, various changes other than those which will be described later, without departing from the spirits thereof. For example, the various modifications which will be described later can be implemented, by being properly combined with each other within a range which causes no technical inconsistency. Members having the same functions as those of the members described in the aforementioned embodiments are designated by the same reference characters, and will not be described redundantly. When only a portion of a structure is described, the structures according to the aforementioned embodiments can be applied to the other portion thereof.

Although, in the aforementioned description, there have been illustrated aspects where the bottom-portion transparence processing is executed after the vehicle-body transparence processing, the present disclosure is not limited thereto. The bottom-portion transparence processing may be executed in parallel with the vehicle-body transparence processing. Drawing of the floor image Pf is an arbitrary element and may be eliminated. For example, when an under-floor image can be drawn at the time of changeover to a vehicle-inside view point, the floor image Pf may be made undisplayed from the beginning. Such a state where an under-floor image can be drawn corresponds to a state where image data necessary for forming an under-floor image has been stored in the image memory M1. The floor image Pf may be displayed, only when an image which can be projected on the vehicle region R0, as an under-floor image, has not yet been accumulated in the image memory M1.

Although there has been disclosed an aspect where the view-point moving phase and the vehicle-body transparence phase are executed completely separately, the present disclosure is not limited thereto. The view-point moving phase and the vehicle-body transparence phase may be partially overlapped with each other. For example, the vehicle-body transparence phase may be started, at timing when the position of the virtual view point VP has come to be at a predetermined distance or less from the last view point VL, such as timing when the virtual view point VP has entered the vehicle room. With this structure, it is possible to shorten the time of animation.

When the virtual view point VP is passing through the roof portion of the vehicle Hv during the view-point moving phase, when the roof-portion image Pr remains untransparent, only the roof-portion image Pr is shown on the screen during scenes showing the virtual view point VP getting closer to the roof portion. As a result thereof, the screen is momentarily occupied by the color of the roof portion, such as a white color or a black color. Immediately thereafter, an image of the inside of the vehicle room is suddenly displayed thereon.

Figure 15:
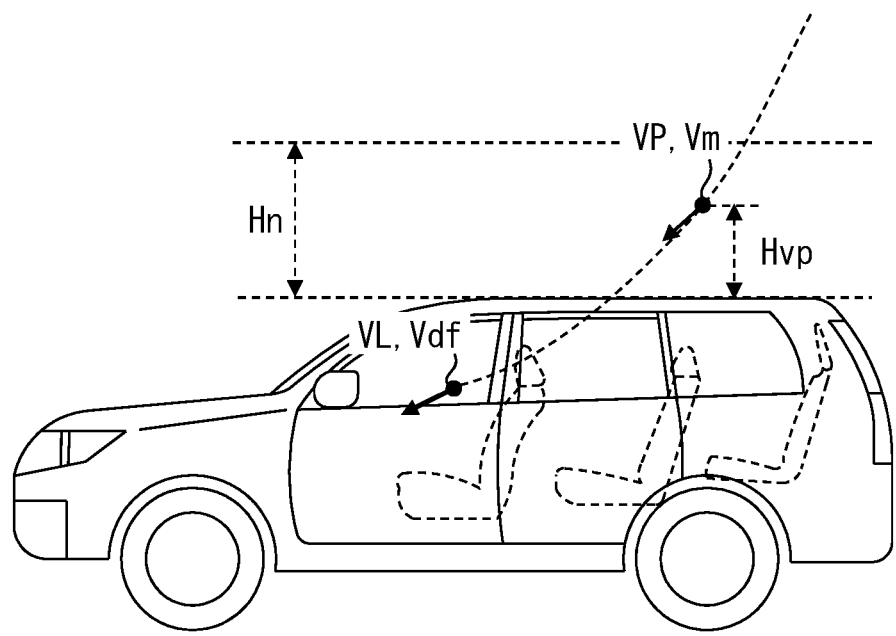
FIG. 15 is a view for explaining an aspect of control of the transparency of a roof-portion image just before the entrance of the virtual view point into a vehicle room.
Figure 16:
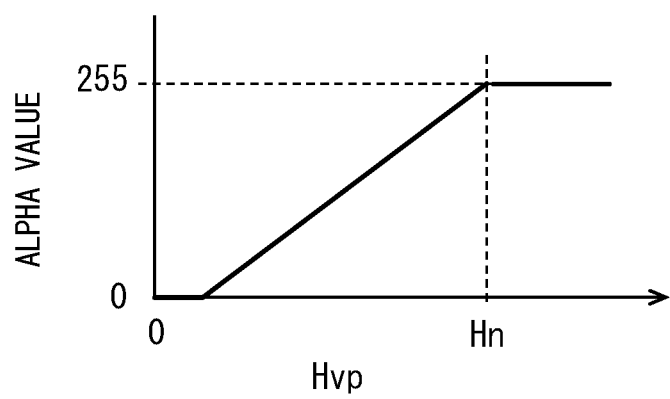
FIG. 16 is a view for explaining an aspect of control of the transparency of the roof-portion image just before the entrance of the virtual view point into the vehicle room.

Such a changeover of the display screen offers the advantage of clearly indicating that the virtual view point VP has entered the vehicle room from the outside of the vehicle room, as one standpoint. However, in another respect, the user can be bothered by the aforementioned sudden transition of the display screen. For coping with this concern, for example, the synthetic-image formation unit F5 may also start making the roof-portion image Pr transparent, at timing when the virtual view point VP has come to be at a predetermined transparence start distance Hn or less from the roof portion, as illustrated in FIG. 15, under the control of the display control unit F6. For example, as illustrated in FIG. 16, the transparency of the roof-portion image Pr may be increased, as the interval Hvp between the roof portion and the virtual view point VP as the midway view point Vm decreases. More specifically, when the interval Hvp between the roof portion and the virtual view point VP is equal to or less than a predetermined threshold value Hth, the transparency thereof may be made 100%. The alpha value represented by the longitudinal axis in FIG. 16 is a parameter indicating the transparency of the roof-portion image Pr, wherein an alpha value of 255 corresponds to a completely-untransparent state, and an alpha value of 0 corresponds to a completely-transparent state.

With the aforementioned structure, during the view-point moving phase, the roof-portion image Pr starts to be made transparent, thereby starting displaying the structures inside the vehicle room, at the time point when the virtual view point VP has come to be at a predetermined distance or less from the roof portion. This results in such animation expression that contents displayed when the virtual view point VP is existing outside the vehicle room are continuous with contents displayed after the virtual view point VP has entered the vehicle room, which can reduce the risk of visually bothering the user. Since the height of the roof portion from the road surface is constant, the interval Hvp between the virtual view point VP and the roof portion can be rephrased as the height of the virtual view point VP from the road surface.

Although, in the aforementioned embodiments, there has been disclosed an aspect where a finally-displayed image taken from a vehicle-inside view point is an image including vehicle CGs which are all made completely transparent, the present disclosure is not limited thereto. Some structures indicating the vehicle outer shape, such as the tire image Pt, may be kept displayed at a transparency enough to be sensed by the user. Such a transparency enough to be sensed by the user is 60% to 85%, for example.

In the aforementioned description, there have been illustrated aspects where animation including moving the view point and making the interior members transparent is displayed, in the case of changing over to a vehicle-inside view point mode. However, the same animation may be implemented, similarly, in the case of changing over to the front camera mode or the rear-camera mode, for example. In cases of changing over to the front camera mode, the forward bird's-eye view point Vbf may be set as the start view point. In cases of changing over to the rear camera mode, the rearward bird's-eye view point Vbb may be set as the start view point. In cases of changing over to the front camera mode, the forward vehicle-inside view point Vdf may be also set as the start view point. In cases of changing over to the rear camera mode, the rearward vehicle-inside view point Vdb may be also set as the start view point. In cases of changing over to a side camera mode, similarly, animation may be displayed.

As a vehicle-inside view point, it is also possible to employ a rightward vehicle-inside view point with a line of sight oriented rightward of the vehicle, and a leftward vehicle-inside view point with a line of sight oriented leftward of the vehicle. The view-point positions of the rightward vehicle-inside view point and the leftward vehicle-inside view point may be at an estimated position of the driver's eyes or at a center potion of the ceiling portion inside the room. In cases of displaying an image taken from the rightward vehicle-inside view point or the leftward vehicle-inside view point, from the standby mode, similarly, it is possible to perform display control involving displaying of the aforementioned animation. In cases of setting these side vehicle-inside view points as the last view point VL, the start view point VS is preferably placed at a position deviated from the position just above the vehicle Hv in the opposite side from the last view point VL. In the aforementioned description, there have been disclosed aspects where the start view point VS for animation is placed at a position deviated from the position just above the vehicle Hv, in the opposite side from the last view point VL, out of the forward, rearward, left and right sides. However, the present disclosure is not limited thereto. The start view point VS may be also set at a position just above the vehicle.

On the other hand, with the structure configured to display the aforementioned animation every time a vehicle-inside view point image PD or a camera image is displayed, the user may be bothered thereby. Particularly, it is expected that this tendency is enhanced for users who are used to the periphery display system Sys. Rather than displaying the aforementioned animation along with every view-point changeover, it is also possible to display it, only when a vehicle-inside view point image PD or a camera image is displayed for the first time after the travelling power source is turned on. In other words, at the times of second and later view-point changeovers after the travelling power source is turned on, it is also possible to eliminate the displaying of animation of interior images and the like. With the structure configured to display the aforementioned animation only when a vehicle-inside view point image PD or a camera image is displayed for the first time after the travelling power source is turned on, it is possible to reduce the risk of bothering the user. Since the aforementioned animation is displayed at least once (namely, at a first time) after the travelling power source is turned on, users who are not used to the periphery display system Sys are allowed to easily understand from which view point the vehicle-inside view point image PD is taken.

Displaying/undisplaying of animation may be made settable by the user, through a setting screen. However, it is expected that some users find it burdensome to perform manipulations for changing the setting, and some users give up changing the setting while necessitating the animation, since they cannot know the method for changing the setting. In view of such circumstances, it is also possible to automatically turn off the displaying of animation, at the time point when the total travelling distance of the vehicle Hv has come to be equal to or more than a predetermined threshold value of 10000 km, for example. Similarly, it is also possible to automatically turn off the displaying of animation, at the timing when a predetermined time period (for example, one year) has elapsed since the date of purchase of the vehicle Hv. The display control unit F6 may be configured to inquire of the user whether or not the displaying of animation is turned off from now on, based on at least one of the fact that the integrated value of the travelling distance has exceeded a predetermined value and the fact that a predetermined time period has elapsed since the date of purchase of the vehicle. This inquiry may be implemented by displaying a predetermined confirmation screen and the like. The display control unit F6 may be configured to change over continuing/turning off of the displaying of animation, based on user's responses to this inquiry.

Figure 17:
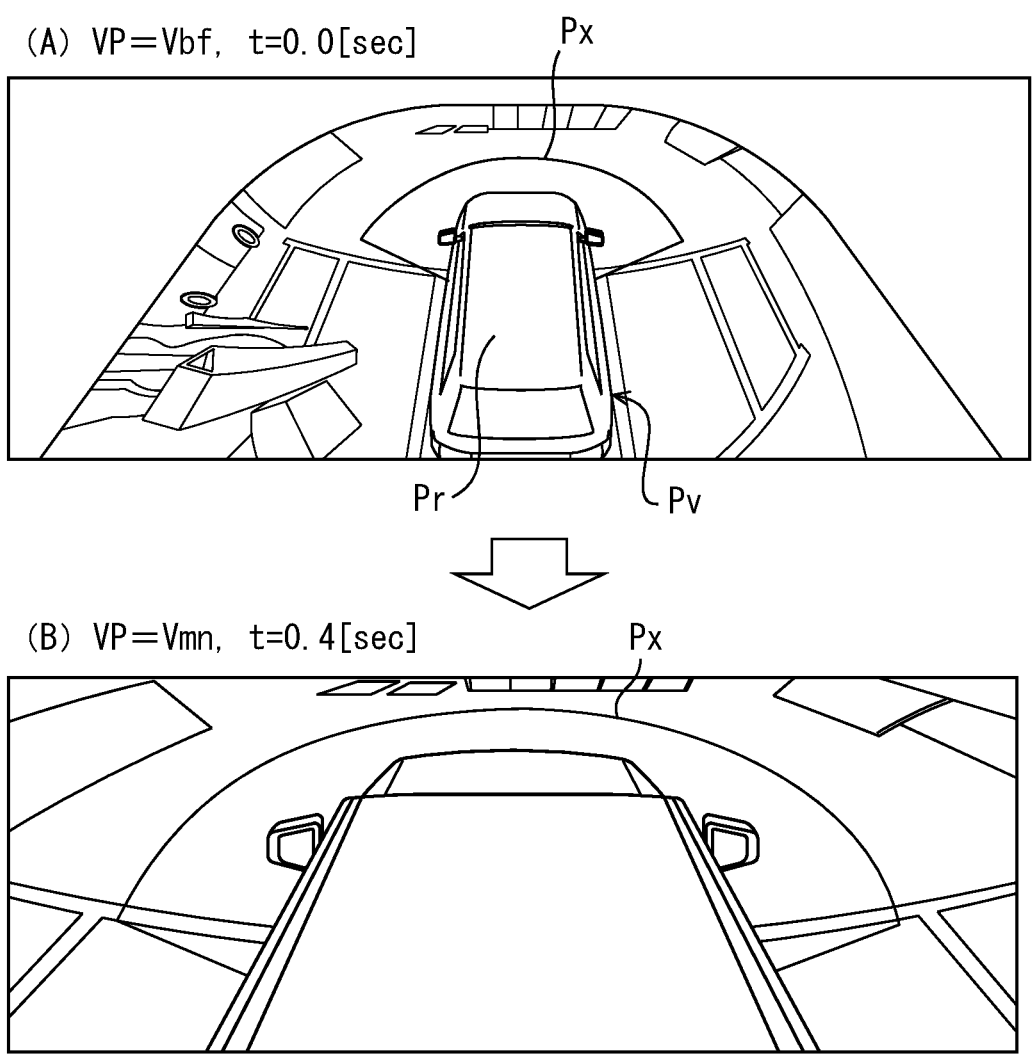
FIG. 17 is a view illustrating an example of display of an image indicating the display range at a final vehicle-inside view point, during the view-point moving phase.

Besides, in the aforementioned animation, while the virtual view point VP exists outside the vehicle room, it is possible to display a last display-range image Px, which is an image indicating the display range at the last view point VL in a periphery image. For example, as illustrated in FIG. 17, in scenes showing the virtual view point VP existing still in the upper sky, at the beginning of the view-point moving phase or the like, the last display-range image Px may be displayed. In the animation, it is also possible to display a view-point path line which is a CG indicating the movement path of the virtual view point VP up to the last view point VL, and the like.

In addition, in the aforementioned description, there has been disclosed the structure configured to provide the view-point moving phase Fs1 in the animation at the time of display changeover. However, the present disclosure is not limited thereto. The view-point moving phase Fs1 is not an essential element and may be eliminated. Namely, the animation at the time of display changeover may be constituted by only the vehicle-body transparence phase Fs2 and the bottom-portion transparence phase Fs3. Similarly, the bottom-portion transparence phase Fs3 is not an essential element and may be eliminated. The animation is required only to include the vehicle-body transparence phase Fs2 for making at least the interior images transparent. The aforementioned animation may be also constituted by only the view-point moving phase Fs1 and the vehicle-body transparence phase Fs2 and by only the vehicle-body transparence phase Fs2. Namely, the present disclosure may be also applied to systems which do not have the function of displaying under-floor images.

In addition, although, in the aforementioned embodiments, there has been disclosed an aspect where the display control unit F6 performs display control for finally making the tire image undisplayed, the present disclosure is not limited thereto. The display control unit F6 may also continue displaying the tire image Pt in a state of having a predetermined untransparency, finally. More specifically, the display control unit F6 may stepwisely reduce the transparency of the tire image Pt at a predetermined speed from 100% to a predetermined target level, at the timing along with the start of making the interior images transparent in the step S207. The target level may be set to be 60% or 40%, for example. A state of having a transparency of 60% corresponds to a state of having an untransparency of 40%. A state of having a transparency of 40% corresponds to a state of having an untransparency of 60%. The transparency as the target level may be set to be a value enough to display the tire image at an untransparency equal to or more than a predetermined threshold value (for example, 30%). With this animation expression, the tire image Pt is gradually displayed along with the start of making the interior images transparent. Further, after the elapse of a predetermined time period since the start of making the interior images transparent, the tire image is displayed in a semi-transparent state where the tire image has a predetermined untransparency.

After the transparency of the tire image Pt has reached the predetermined target level, the tire image Pt is kept displayed, even after the step S209, for example. While the tire image Pt is kept displayed in a semi-transparent or untransparent state, the floor image Pf may be stepwisely changed in transparency from a completely-untransparent state to a completely-transparent state, similarly to in the aforementioned embodiments. With the aforementioned structure, the tire image Pt is kept displayed even after the completion of the series of animation, which allows the driver to easily recognize the positions of the tires on the road surface.

<Remarks>

The device, the system and the methodology therefor which have been disclosed in the present disclosure may be realized by dedicated computers which constitute processors programmed for executing one or more functions concretized by computer programs. The device and the methodology therefor which have been disclosed in the present disclosure may be also realized using dedicated hardware logic circuits. The device and the methodology therefor which have been disclosed in the present disclosure may be also realized by one or more dedicated computers constituted by the combination of a processor for executing computer programs and one or more hardware logic circuits. The computer programs as instructions to be executed by the computers may be stored in computer-readable non-transitory tangible storage mediums. Namely, the means and/or the functions which are provided by the image formation ECU 1 and the like may be provided by software stored in tangible memory devices and computers for executing them, only software, only hardware, or a combination thereof. For example, some or all of the functions included in the image formation ECU 1 may be realized as hardware. Aspects where a certain function is realized by hardware include aspects where the function is realized using one or more ICs and the like. The image formation ECU 1 may be also realized by using an MPU, a GPU or a DFP (Data Flow Processor), instead of a CPU. The image formation ECU 1 may be also realized by the combination of a plurality of types of arithmetic processing devices, such as a CPU, an MPU, and a GPU. The image formation ECU 1 may be also realized as a system-on-chip (SoC). Further, the various types of processing units may be also realized by using FPGAs (Field-Programmable Gate Arrays) or ASICs (Application Specific Integrated Circuits). The various types of programs may be stored in non-transitory tangible storage mediums. As mediums for storing the programs, it is possible to employ various storage mediums, such as HDDs (Hard-disk drives), SSDs (Solid State Drives), flash memories, SDs (Secure Digital) cards, and the like.

What is claimed is:

1. A periphery-image display device for a vehicle, comprising:
at least one processor configured to:
form a periphery image, which is a synthetic image showing a region of a periphery of the vehicle viewed from an arbitrary virtual view point, by using a plurality of camera images captured by a plurality of cameras configured to photograph the periphery of the vehicle;
execute processing to display, on a display, the periphery image;
form a vehicle-inside view point image, which is the periphery image showing a periphery of the vehicle viewed from a vehicle-inside view point positioned inside a vehicle room in such a way as to transparently pass through a portion or an entirety of the vehicle;
form an interior-added image, which is a synthetic image including an image of an interior member viewed from the vehicle-inside view point, by using data, which is for drawing an image of the interior member and stored in a predetermined storage medium;
when changing over a display screen to the vehicle-inside view point image in response to a user's manipulation on the vehicle, before displaying the vehicle-inside view point image, display an animation that stepwisely moves a position of the virtual view point from a start view point, which is set at a predetermined position outside the vehicle room, to the vehicle-inside view point as a target view point and thereafter to gradually raise the transparency of the image of the interior member; and start processing to gradually raise the transparency of the image of the interior member and to perform an animation expression to display an image of a tire as non-transparent, which is equal to or more than a predetermined threshold value, after elapse of a predetermined time period since start of rendering the interior member transparent, after the virtual view point has reached the vehicle-inside view point as the target view point.

2. The periphery-image display device according to claim 1, wherein
during a stage, in which the virtual view point is moved, the image of the interior member existing in a field of view at the virtual view point is displayed in a non-transparent state or in a semi-transparent state.

3. The periphery-image display device according to claim 2, wherein
the start view point is set at different positions, according to at least one of a position or a sight direction of the target view point.

4. A periphery-image display device for a vehicle, comprising:
at least one processor configured to:
form a periphery image, which is a synthetic image showing a region of a periphery of the vehicle viewed from an arbitrary virtual view point, by using a plurality of camera images captured by a plurality of cameras configured to photograph the periphery of the vehicle;
execute processing to display, on a display, the periphery image;
form a vehicle-inside view point image, which is the periphery image showing a periphery of the vehicle viewed from a vehicle-inside view point positioned inside a vehicle room in such a way as to transparently pass through a portion or an entirety of the vehicle;
form an interior-added image, which is a synthetic image including an image of an interior member viewed from the vehicle-inside view point, by using data, which is for drawing an image of the interior member and stored in a predetermined storage medium; and
when changing over a display screen to the vehicle-inside view point image in response to a user's manipulation on the vehicle, before displaying the vehicle-inside view point image, display an animation that stepwisely moves a position of the virtual view point from a start view point, which is set at a predetermined position outside the vehicle room, to the vehicle-inside view point as a target view point and thereafter to gradually raise the transparency of the image of the interior member; and
set, as the start view point, a first bird's-eye view point placed above the vehicle and at a position deviated by a predetermined amount from a position just above the vehicle rearward of the vehicle, when the vehicle-inside view point as the target view point is a first vehicle-inside view point with a line of sight oriented forward of the vehicle; and
set, as the start view point, a second bird's-eye view point placed above the vehicle and at a position deviated by a predetermined amount from the position just above the vehicle forward of the vehicle, when the vehicle-inside view point as the target view point is a second vehicle-inside view point with a line of sight oriented rearward of the vehicle.

5. A periphery-image display device for a vehicle, comprising:
at least one processor configured to:
form a periphery image, which is a synthetic image showing a region of a periphery of the vehicle viewed from an arbitrary virtual view point, by using a plurality of camera images captured by a plurality of cameras configured to photograph the periphery of the vehicle;
execute processing to display, on a display, the periphery image;
form a vehicle-inside view point image, which is the periphery image showing a periphery of the vehicle viewed from a vehicle-inside view point positioned inside a vehicle room in such a way as to transparently pass through a portion or an entirety of the vehicle;
form an interior-added image, which is a synthetic image including an image of an interior member viewed from the vehicle-inside view point, by using data, which is for drawing an image of the interior member and stored in a predetermined storage medium;
when changing over a display screen to the vehicle-inside view point image in response to a user's manipulation on the vehicle, before displaying the vehicle-inside view point image, display an animation that stepwisely moves a position of the virtual view point from a start view point, which is set at a predetermined position outside the vehicle room, to the vehicle-inside view point as a target view point and thereafter to gradually raise the transparency of the image of the interior member; and
place the start view point above the vehicle and to display the synthetic image including a last display-range image, which indicates a road-surface range to be finally displayed as the vehicle-inside view point image, when the virtual view point exists outside the vehicle room during the virtual view point moves.

6. The periphery-image display device according to claim 5, wherein
the at least one processor is configured to display, as the vehicle-inside view point image, a synthetic image formed by superimposing at least one of a vehicle border line indicating a border of a range in which a vehicle body exists, a tire border line indicating a border of a range in which a tire exists, an image of the tire, or a grounding-region image indicating a region in which the tire is grounded to a ground surface, on an external-world image formed by synthesizing the camera images.

7. A periphery-image display device for a vehicle, comprising:
at least one processor configured to:
form a periphery image, which is a synthetic image showing a region of a periphery of the vehicle viewed from an arbitrary virtual view point, by using a plurality of camera images captured by a plurality of cameras configured to photograph the periphery of the vehicle;
execute processing to display, on a display, the periphery image;
form a vehicle-inside view point image, which is the periphery image showing a periphery of the vehicle viewed from a vehicle-inside view point positioned inside a vehicle room in such a way as to transparently pass through a portion or an entirety of the vehicle;
form an interior-added image, which is a synthetic image including an image of an interior member viewed from the vehicle-inside view point, by using data, which is for drawing an image of the interior member and stored in a predetermined storage medium;

temporarily display the interior-added image and display animation, which gradually raises a transparency of the image of the interior member, when changing over a display screen from the interior-added image to the vehicle-inside view point image in response to a user's manipulation on the vehicle, wherein the vehicle-inside view point image is displayed after the animation is displayed when the vehicle-inside view point image is displayed for the first time after a vehicle power source is turned on, and the displaying of the animation is eliminated when the vehicle-inside view point image is displayed for the second time or later after the vehicle power source is turned on.

* * * * *